(12) United States Patent
Vaishnav et al.

(10) Patent No.: US 12,136,114 B2
(45) Date of Patent: Nov. 5, 2024

(54) SYSTEM AND METHOD FOR ASYNCHRONOUS PRICING TO IMPROVE PRICING SERVICE SCALABILITY

(71) Applicant: Salesforce, Inc., San Francisco, CA (US)

(72) Inventors: Parth Vijay Vaishnav, Newark, CA (US); Mitchell Christensen, Grass Valley, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/933,731

(22) Filed: Sep. 20, 2022

(65) Prior Publication Data
US 2024/0095789 A1    Mar. 21, 2024

(51) Int. Cl.
*G06Q 30/0283*    (2023.01)

(52) U.S. Cl.
CPC ................. *G06Q 30/0283* (2013.01)

(58) Field of Classification Search
CPC .................................. G06Q 30/0283
USPC ........................................... 705/400
See application file for complete search history.

(56) References Cited

U.S. PATENT DOCUMENTS

| | | | |
|---|---|---|---|
| 8,458,009 B1 * | 6/2013 | Southworth | ........... G06Q 10/06 705/400 |
| 9,740,743 B2 | 8/2017 | Jagota et al. | |
| 9,747,481 B1 | 8/2017 | Bondarenko et al. | |
| 10,235,476 B2 | 3/2019 | Vaishnav et al. | |
| 10,558,626 B2 | 2/2020 | Vaishnav | |
| 10,671,604 B2 | 6/2020 | Dvinov et al. | |
| 10,725,926 B2 | 7/2020 | Jones | |
| 10,733,613 B2 | 8/2020 | Vaishnav et al. | |
| 10,789,048 B2 | 9/2020 | Kismartoni et al. | |
| 10,942,906 B2 | 3/2021 | Hersans et al. | |
| 11,138,222 B2 | 10/2021 | Semlani et al. | |
| 11,232,166 B2 | 1/2022 | Howe et al. | |
| 11,354,285 B2 | 6/2022 | Ker et al. | |
| 2003/0023512 A1 * | 1/2003 | Festa | ................... G06Q 30/0641 705/26.8 |
| 2003/0217169 A1 | 11/2003 | James et al. | |

(Continued)

OTHER PUBLICATIONS

"Job Evaluation Versus Market Pricing: Competing or Combining Methods of Pay Determination" Published by Sage Journals (Year: 2017).*

(Continued)

*Primary Examiner* — Zeina Elchanti
(74) *Attorney, Agent, or Firm* — Nicholson De Vos Webster & Elliott LLP

(57) ABSTRACT

Apparatus and method for asynchronous pricing. For example, some implementations include an asynchronous pricing service in addition to the pricing service. When performing a first pricing operation on a first set of pricing data, the pricing service performs operations on a pricing engine. In response to a second pricing request at the asynchronous pricing service with a second set of pricing data, the second set of pricing data is subdivided into a plurality of portions and a corresponding plurality of pricing jobs are specified, which are independently executed by the pricing engine to produce a corresponding plurality of partial pricing results. The asynchronous pricing service aggregates the partial pricing results to generate a second pricing result.

16 Claims, 23 Drawing Sheets

(56) References Cited

U.S. PATENT DOCUMENTS

| | | |
|---|---|---|
| 2007/0282900 A1 | 12/2007 | Owens et al. |
| 2013/0117405 A1 | 5/2013 | Ebdon et al. |
| 2015/0331675 A1 | 11/2015 | De Magalhaes |
| 2016/0110354 A1 | 4/2016 | Jagota et al. |
| 2016/0350440 A1 | 12/2016 | Vaishnav et al. |
| 2018/0025038 A1 | 1/2018 | Semlani et al. |
| 2018/0129686 A1 | 5/2018 | Vaishnav |
| 2018/0189792 A1 | 7/2018 | Vaishnav et al. |
| 2019/0227937 A1 | 7/2019 | Ramamurthy et al. |
| 2020/0250189 A1 | 8/2020 | Dvinov et al. |
| 2020/0311038 A1 | 10/2020 | Zhang et al. |
| 2021/0182255 A1 | 6/2021 | Hersans et al. |
| 2021/0241300 A1 | 8/2021 | Vaishnav et al. |
| 2021/0241301 A1 | 8/2021 | Christensen et al. |
| 2021/0241328 A1 | 8/2021 | Christensen et al. |
| 2021/0241329 A1 | 8/2021 | Christensen et al. |
| 2021/0241330 A1 | 8/2021 | Vaishnav et al. |
| 2021/0326311 A1 | 10/2021 | Ker et al. |
| 2021/0406936 A1 | 12/2021 | Christensen et al. |
| 2022/0374355 A1 | 11/2022 | Du et al. |

OTHER PUBLICATIONS

U.S. Appl. No. 17/933,722, Pending.
Non-Final Office Action, U.S. Appl. No. 17/933,722, May 9, 2024, 22 pages.

\* cited by examiner

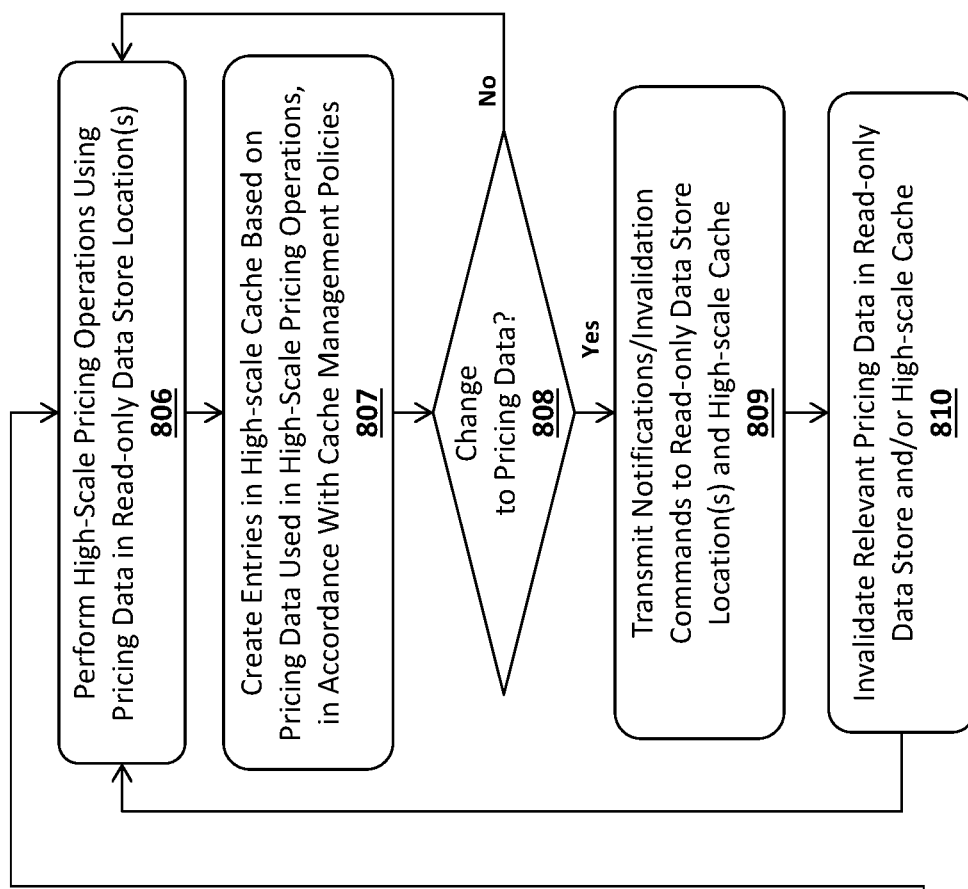
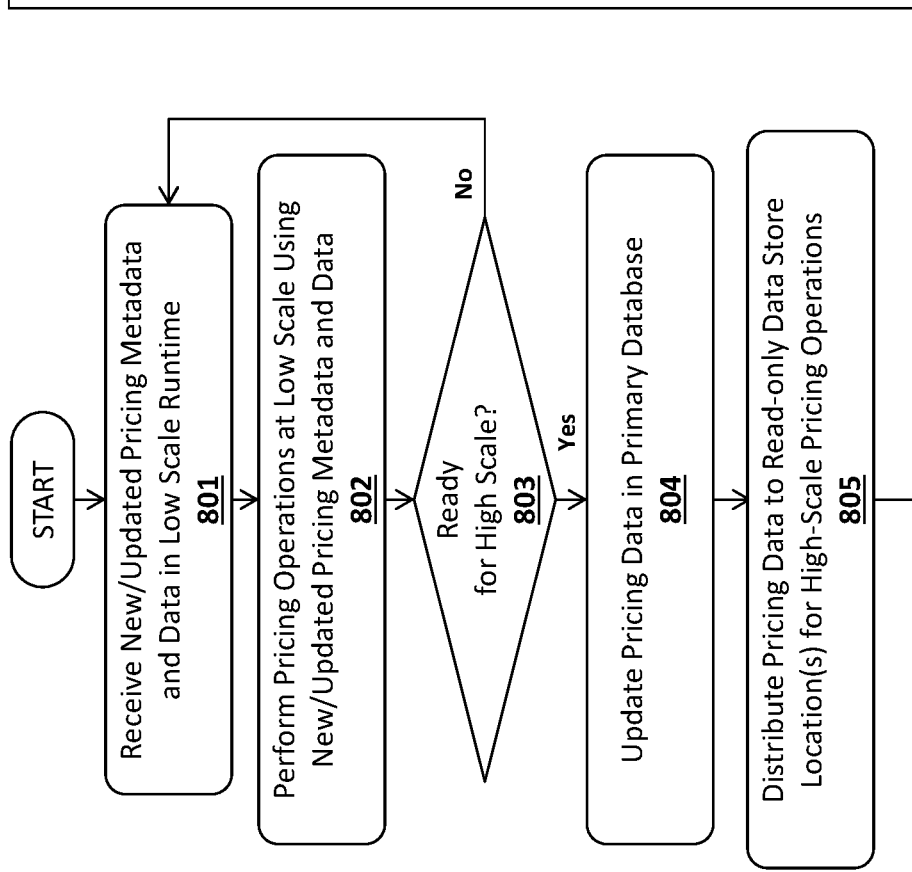
FIG. 8

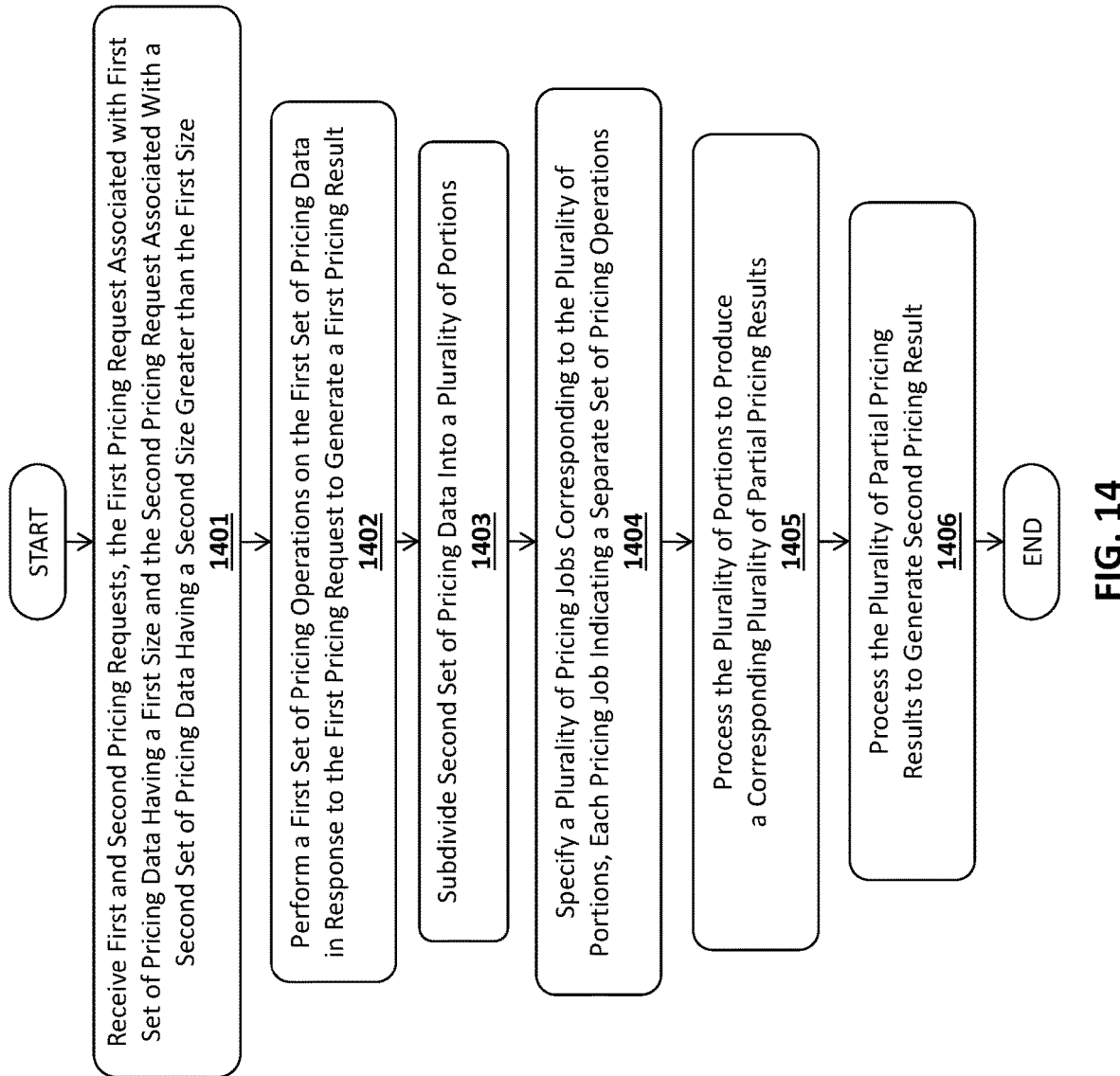

SYSTEM AND METHOD FOR ASYNCHRONOUS PRICING TO IMPROVE PRICING SERVICE SCALABILITY

TECHNICAL FIELD

One or more implementations relate to the field of computer systems for providing scalable services; and more specifically, to a system and method for asynchronous pricing to improve pricing service scalability.

BACKGROUND ART

In business operations, the generation of pricing is often a computationally intensive task. Each sales item of a large sales order or other pricing transaction may require a different pricing method, with each method requiring numerous processes.

In providing support for client pricing operations, a central pricing engine architecture can be used to provide efficient and effective pricing operations for multiple clients without requiring the support of an internal pricing structure for each such client, thereby improving the efficiency of client operations.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 8 illustrates a method for implementing a low-scale pricing runtime and a scalable pricing runtime;

FIG. 14 illustrates a method for synchronous and asynchronous pricing request processing in accordance with some implementations;

DETAILED DESCRIPTION

Figure 1:
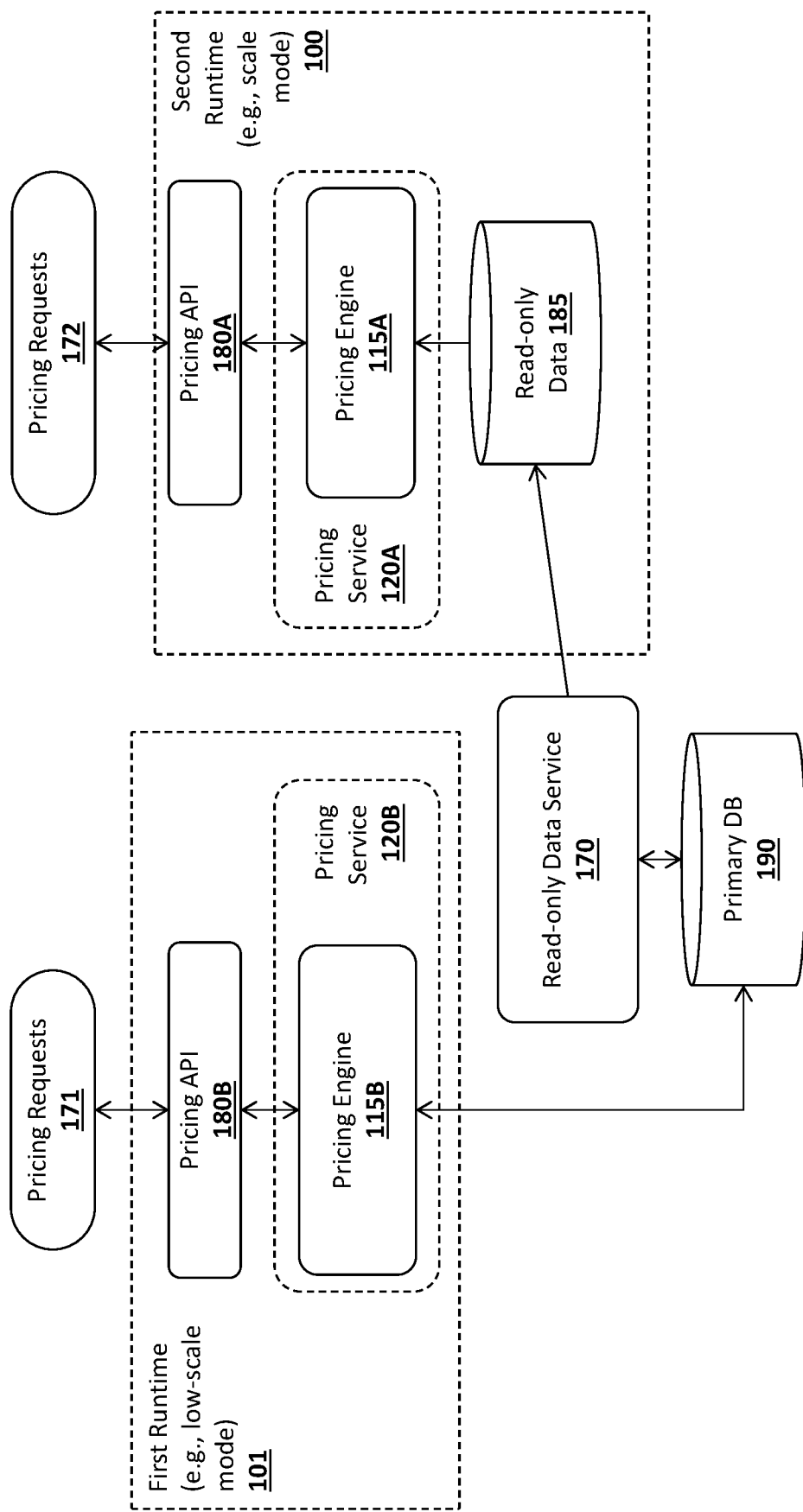
FIG. 1 illustrates first and second pricing runtimes in accordance with some implementations.

The following description includes implementations of a system and method for a scalable pricing engine. These implementations include two separate business contexts: a first business context for designing and periodically updating the pricing engine in a low scale runtime and a second business context for operating the pricing engine in a scale-mode or scalable pricing runtime.

In various implementations, the design time environment of the first business context is flexible, metadata driven and customizable, allowing a user to test, author and build out implementations before deploying them to a high-scale production environment. In some implementations, the design time environment is also used for low-scale use cases that do not need the full gamut of features of the high-scale use cases. The second business context, the scale-mode pricing runtime, is configured to serve requests at high-scale, dynamically adjusting processing resources as needed to meet the current request load. In addition to scalability, this environment provides high performance, availability, and uptime with one or more of the implementations described below.

In some implementations, a distributed data service ensures that the pricing data needed for performing pricing operations is copied or cloned from the primary database to distributed data storage locations near the running instances of the pricing engine, thereby improving latency for data accesses and reducing the load on the primary database. In at least some implementations, the distributed data service is a read-only service, so that various types of resource-intensive synchronization operations such as write transactions and database updates are not required. In addition, at least some of these implementations achieve horizontal scalability through controlled and strategic caching of the read-only pricing data across the pricing service. The pricing engine in the scale-mode runtime includes a pricing application programming interface (API) which reduces data traffic with endpoints such as external clients and internal services by removing redundancies and unnecessary data when serializing object graphs, thereby further enhancing scalability.

Some implementations also, or alternatively, include an asynchronous pricing service to perform pricing operations asynchronously. In particular, an asynchronous pricing API is provided for very large pricing requests such as pricing requests involving thousands of sales transaction items. In response to the large pricing request, the asynchronous pricing service subdivides the pricing data into a plurality of chunks which can be executed separately, and at least partially in parallel. A separate, independent pricing job is queued and processed for each chunk to generate a set of partial pricing results. Derived pricing operations, if needed, are performed on the partial pricing results and the partial pricing results are aggregated to produce the final pricing result, which is returned to the requestor via the asynchronous pricing API.

Thus, two independent but combinable concepts are described for implementing a pricing mechanism (that is, a mechanism for receiving pricing requests and providing pricing responses); namely: 1) separate pricing runtimes for low-scale and high-scale pricing; 2) asynchronous pricing. Thus, the term "pricing mechanism" can refer to implementations that apply either or both of these concepts. When combined, the asynchronous pricing service can be operated within either the low-scale pricing runtime or the scale-mode pricing runtime.

As illustrated in FIG. 1, in some implementations, a first runtime 101 includes a first pricing engine 115B running in a first pricing service 120B. A corresponding pricing API 180B services pricing requests 171 at low scale (e.g., below a threshold number per unit of time) using pricing data in a primary database 190. In some implementations, the first runtime 101 has read and write access the primary database 190.

FIG. 1 also illustrates a second runtime 100 in which a second pricing engine 115A operates within a second pricing service 120A. A corresponding pricing API 180A services pricing requests 172 at high-scale (e.g., above the threshold number) using pricing data 185 provided by a scalable read-only data service 170. In some implementations, the scalable read-only data service 170 provides a read-only copy 185 of at least a portion of the pricing data from the primary database 190 to the second runtime 100. In these implementations, the read-only data service 170 (or other system component) monitors the primary database 190 to detect changes. In response to detecting changes to the pricing data stored in the primary database 190, a corresponding portion of the read-only copy 185 is invalidated and/or updated.

Figure 2:
FIG. 2 illustrates a pricing method in accordance with some implementations.

In some implementations, a method is performed on a set of one or more electronic devices to perform pricing operations. In at least one implementation illustrated in FIG. 2, a pricing request is received at 201. The pricing request is either handled by a first pricing runtime (e.g., a low scale runtime as described herein) or a second pricing runtime (e.g., a scale-mode pricing runtime as described herein), as determined at 202. If the pricing request is handled by the first runtime, then at 203 the first pricing runtime services the pricing request using pricing data from a primary database (e.g., the source repository of pricing data). In some implementations, the first runtime has read and write access to the primary database. If the pricing request is handled by the second runtime, then at 204, the second runtime services the pricing request using a read-only copy of the pricing data cloned from the primary database. At 205, the primary database is monitored, and if a change to a relevant portion of the pricing data is detected, then the read-only copy of the pricing data is invalidated and/or updated.

Exemplary Implementations of a Pricing Engine

Per above, implementations are described that make a pricing engine a scalable pricing engine. While some exemplary pricing engine implementations are described herein to provide context, it should be understood that other pricing engines may be made scalable pricing engines using the techniques described herein.

First Type

One type of exemplary pricing engine uses a pricing framework that incorporates a pricing algorithm for a client's pricing operation within the pricing engine, and thus must be modified when a pricing algorithm is added or modified.

Second Type

Another type of exemplary pricing engine uses a pluggable framework to provide for incremental development of both internal pricing constructs as well as custom pricing constructs defined by entities (e.g., services or users) internal to the provider of the pricing service and/or external to the provider of the pricing service (e.g., customers of the provider of the pricing service, which can include vendors or customers of those vendors, collectively referred to as clients. Pricing logic (sometimes referred to as a pricing method) is implemented as a plugin to the pricing engine that can be selected by the client.

In some implementations, a host pricing engine has no knowledge regarding the pricing constructs that define the various pricing algorithms, allowing clients to define their own pricing constructs to suit their specific business needs without requiring modification of the pricing engine.

The pricing framework includes plugins for common use cases to be supported for multiple or all clients of the pricing engine (e.g., Standard Unit Price, Standard Term Price, or other standard pricing methods), and also allows customization of such standard plugins to enable certain clients, such as large enterprises, industry partners, and customers with special requirements to make modifications to the pricing methods as needed. Each pricing method includes one or more standard and/or custom pricing functions that can be modified or replaced. A custom pricing function may, for example, allow access to external proprietary data or processes. As used herein, "standard" refers to a method or function can be made available to multiple or all clients of a pricing system, while "custom" refers to a method or function that is generated for a particular client, and may, for example, utilize proprietary data or operations.

In some implementations, a pricing platform includes the pluggable pricing engine supporting a pricing service. In this architecture, a pricing method defines the pricing for a particular sales item, with the pricing method plugging into the pricing platform. Each pricing method includes one or more pricing functions that define each operation that is performed in the pricing method.

In some implementations, prior to any price calculations for a pricing request, the pricing engine validates the input parameters for the request, and has the option of pre-loading (for example, using cache storage) and validating any required pricing-related data (e.g., Product and PricebookEntry data, discount schedules, and other data). In the price calculation for each sales item, each sales item is processed by first determining the appropriate pricing method. Such a determination may be based, for example, on the associated Product or PricebookEntry data or other similar data. Further, a context for calculating the sales item price is prepared and the appropriate pricing method (i.e., the pricing method plugin, such as illustrated in FIGS. 3-6) is invoked, with the pricing method being passed with the sales item context.

In some implementations, pricing methods for a pricing engine are implemented as plugins to the pricing engine. As used herein, a pricing method is comprised of an ordered set of pricing functions that define the calculation of pricing for a sales item. A pricing function is a cohesive logical pricing operation that defines a single process within a pricing method. Once the sales items in a particular pricing request have been priced according to the respective pricing method for each such sales item, aggregate pricing may then be performed, with aggregate pricing including summarizing totals at a header level, etc., to complete the full pricing operation for the pricing request. The pricing results may then be reported to the appropriate client.

As used herein, "sales transaction" refers to any sales order or inquiry for one or more sales items, with each sales item including a certain quantity; "pricing plan" refers to calculations performed to generate pricing for the one or more sales item in a sales transaction; and "pricing flow" refers to the context for a particular pricing request.

Figure 3A:
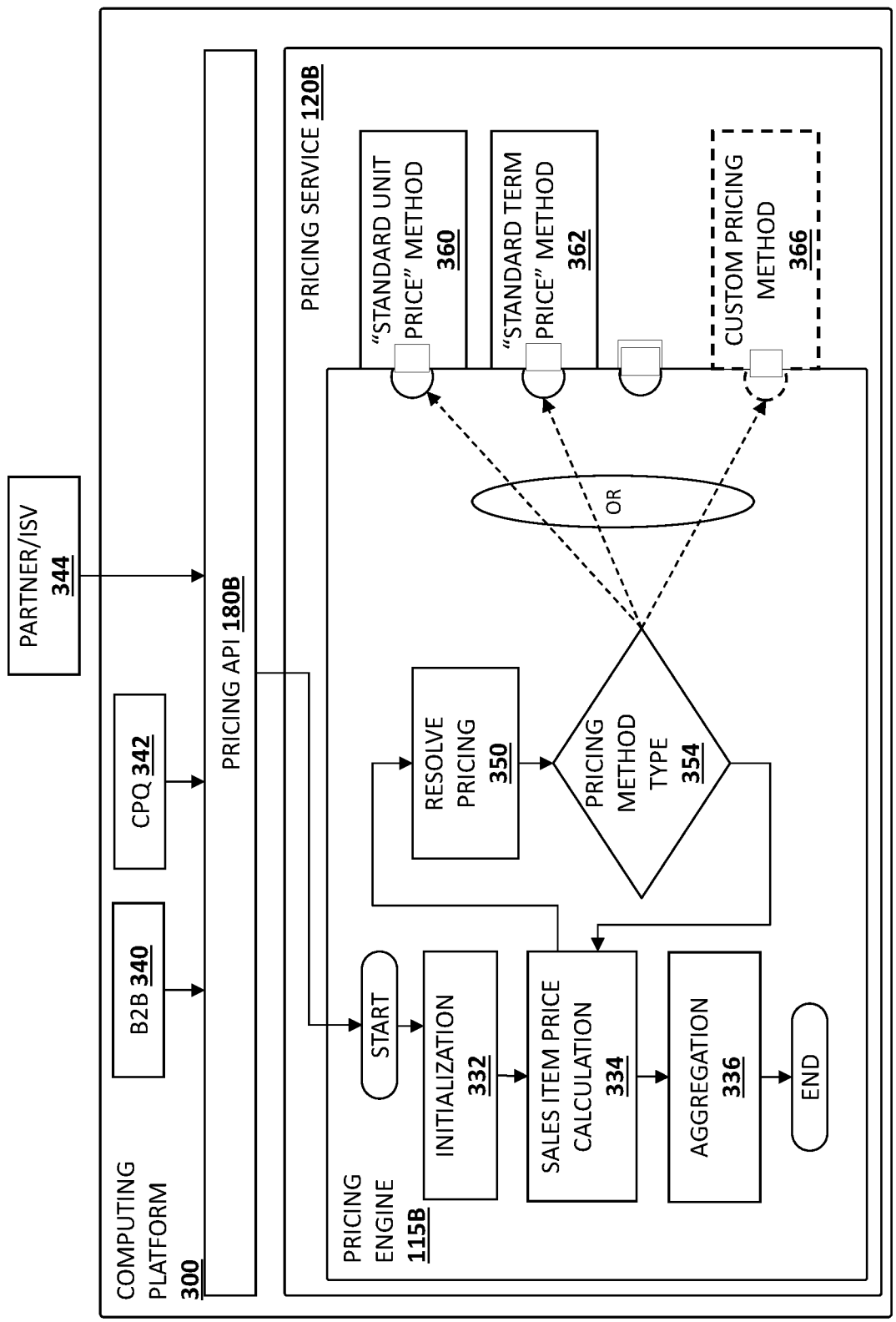
FIG. 3A illustrates a computing platform including a pluggable pricing architecture according to some implementations.

FIG. 3A illustrates a computing platform including a pluggable pricing architecture according to some implementations. As illustrated, a computing platform 300 may provide multiple services including, but not limited to, a pricing service 120B (the host pricing service) to provide pricing operations for multiple different types of sales operations for different entities (e.g., internal and external clients, other services, etc). In some implementations, the pricing service 120B is a wrapper that encapsulates a pricing engine 115B which includes the logic to perform the requested pricing operations. The computing platform 300 may include numerous other operations and functions that are not described herein.

The computing platform 300 may include a pricing application programming interface (API) 180B for connection of multiple different types of entities that generate pricing requests. In response to a pricing request received from the pricing API 180B, the pricing service 120B validates the request (e.g., by ensuring that the pricing request is properly formatted and that the entity making the request is authorized to do so), and may also retrieve pricing data from the database (not shown). If the request is validated, the pricing service 120B then calls the pricing engine 115B which performs the requested pricing operations. By way of example, and not limitation, the pricing requests may include business to business (B2B) requests 340 and configure-price-quote (CPQ) requests 342 provided within the computing platform 300, and partner or independent software vendor (ISV) requests 344 received from outside the computing platform 300. Other types of pricing requests may also be received.

In some implementations, the pricing engine 115B performs a getPrice function to determine pricing for one or more sales items in a sales transaction, the sales items being any combination of goods and services. In a basic operation, the getPrice function for a particular request includes initialization of the pricing operation 332, sales price calculation for each sales item of the request 334, and aggregation of the pricing calculations to generate a pricing output 336 to be provided to the client. In some implementations, the sale item price calculation 334 includes resolving a pricing method for a sales item 350, wherein each sales item may utilize a different pricing method, and selecting and running the appropriate pricing method 354 for the sales item.

In some implementations, the pricing architecture is a pluggable architecture in which multiple different pricing methods may be plugged for use in one or more sale transactions. The pricing method for a sales item may include a pricing method of one or more standard pricing methods provided by the pricing service, or a particular custom pricing method of one or more custom pricing methods for the client. In a particular example, the pricing methods available at particular point in time for a client utilizing the pricing service 120B are a Standard Unit Price method 360, a Standard Term Price method 362, or a custom pricing method 366. In some implementations, the standard pricing methods 360 and 362 are available to multiple or all clients of the pricing service, and the custom pricing method 366 is available only to a particular client, wherein the custom pricing method 366 may include confidential and exclusive features established by or for the client. Any number of pricing methods may be available in a particular implementation. In some implementations, pricing methods are plugged into the pricing service 120B without requiring modification or reprogramming of the pricing service 120B, and such pricing methods may be replaced by other or different pricing methods as required for all clients or any particular client.

Figure 3B:
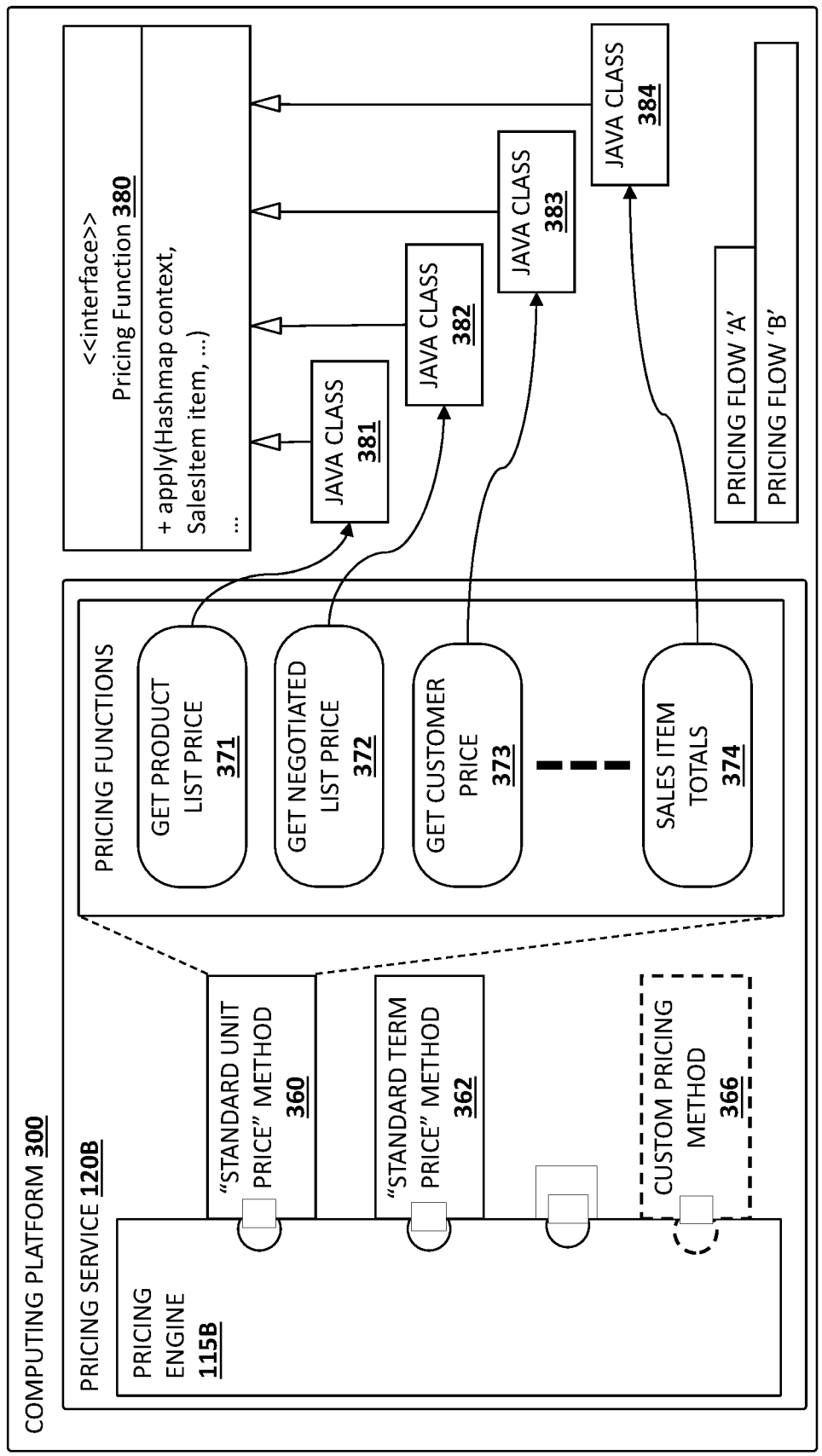
FIG. 3B illustrates a computing platform including a first pricing method for a pluggable pricing architecture according to some implementations.

FIG. 3B illustrates a computing platform including a standard pricing method for a pluggable pricing architecture according to some implementations. As illustrated, the computing platform 300 includes pricing service 120B which includes the pricing engine 115B to perform the getPrice function. The pricing methods to be plugged into the pluggable pricing architecture are a Standard Unit Price method 360, a Standard Term Price method 362, and a custom pricing method 366.

As illustrated in FIG. 3B, the Standard Unit Price method 360 includes multiple pricing functions that performed as required in response to a pricing request. In this particular example, the Standard Unit Price method 360 includes the standard pricing functions: Get Produce List Price 371 represented by Java Class 381, Get Negotiated Price 372 represented by Java Class 382, Get Customer Price 373 represented by Java Class 383, and continuing through Calculate Sales Items Totals 374 represented by Java Class 384. In some implementations, each of the Java classes 381-384 representing the standard pricing functions 371-374 are associated with a pricing function interface 380.

As further depicted in FIG. 3B, the Standard Unit Price method 360 is comprised of an ordered sequence of logical processes that together complete the price calculation for a given sales item, with each logical process within the pricing method comprising a pricing function. In some implementations, the pricing method is defined as metadata that declares the globally unique name of the pricing method, a set of specific set of pricing functions, the execution order of those pricing functions, and whether or not each function is applicable within the context of a specified Pricing Flow. For example, the FIG. 3B further illustrates a Pricing Flow A and a Pricing Flow B, each of which define a particular set of the pricing functions as being applicable in the pricing flow.

FIG. 3B illustrates a particular standard pricing method composed of standard pricing functions. In some implementations, a pricing engine 115B also supports one or more custom pricing methods, which may allow for functions including client specific pricing.

Figure 3C:
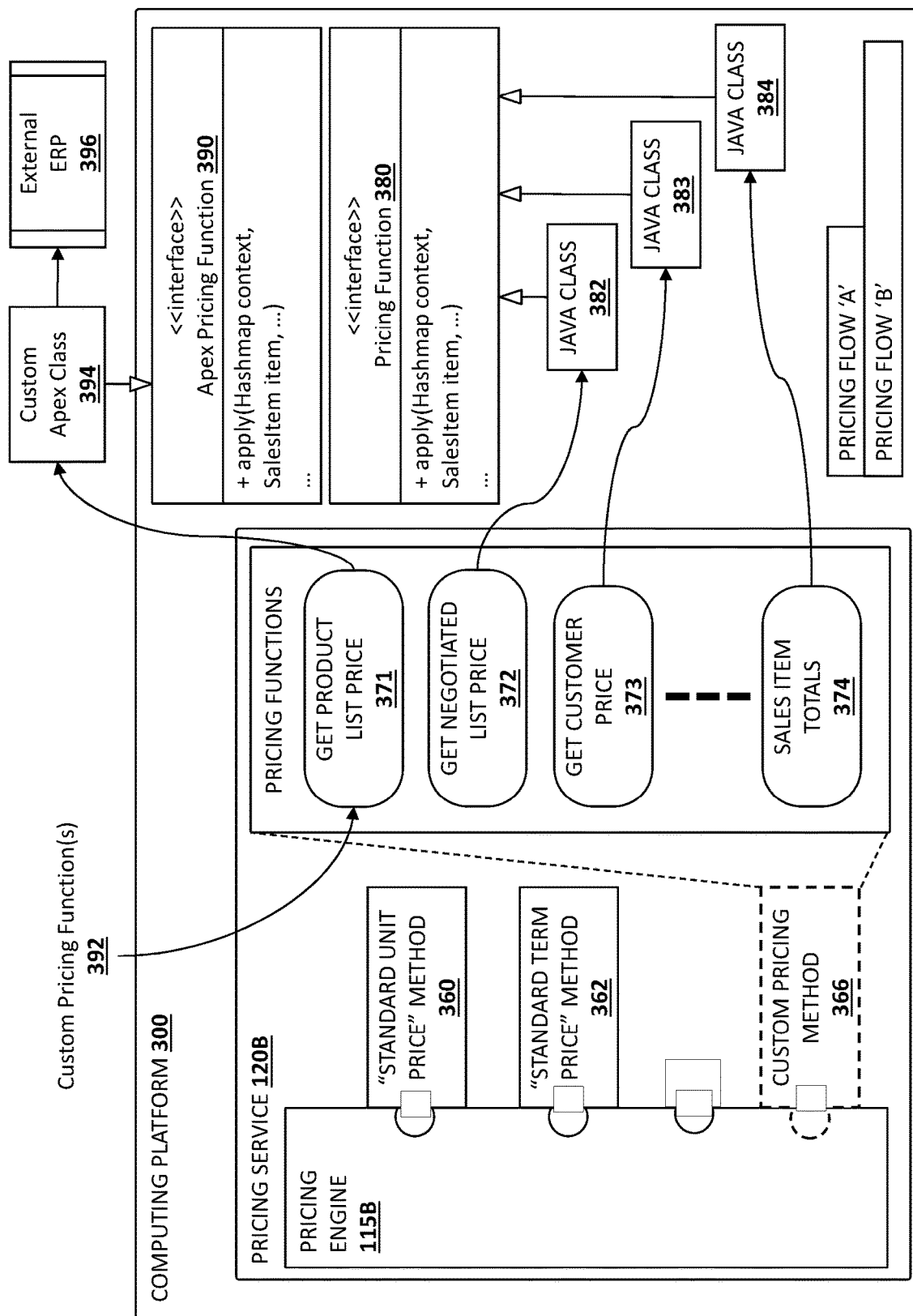
FIG. 3C illustrates a computing platform including a second pricing method for a pluggable pricing architecture according to some implementations.

FIG. 3C illustrates a computing platform including a custom pricing method for a pluggable pricing architecture according to some implementations. As illustrated, the computing platform 300 includes pricing service 120B, with the pricing service 120B including the pricing engine 115B performing the getPrice function. The pricing methods to be plugged into the pluggable pricing architecture are a Standard Unit Price method 360, a Standard Term Price method 362, and a custom pricing method 366. FIG. 3C specifically depicts a custom pricing method 366 that leverages a single custom pricing function. However, implementations are possible, in which any number of custom pricing functions may be utilized in a custom pricing method.

As illustrated in FIG. 3C, the custom pricing method 366 includes multiple pricing functions that performed as required in response to a pricing request. In this particular example, the custom pricing method 360 includes a mixture of custom and standard pricing functions, and specifically one or more custom pricing functions 392 including a Get Product List Price 371, which is represented by a custom Apex class 394 to draw from an external ERP (Enterprise Resource Planning) system 396, thus allowing the client to utilize client-specific pricing data while operating within the pricing service 120B. In this example, the custom pricing function 371 is followed by standard functions: Get Negotiated Price 372 represented by Java Class 382, Get Customer Price 373 represented by Java Class 383, and continuing through Calculate Sales Items Totals 374 represented by Java Class 384. In some implementations, the custom Apex class 394 for the custom pricing function is associated with pricing function Apex interface 390, while each of the Java classes 382-384 representing the standard pricing functions 372-374 are associated with a pricing function interface 380.

Some implementations provide for processing of sales transactions as a uniform abstract model in pricing engine operations. As used herein, a sales transaction refers to a high-level abstract interface that is object agnostic and can apply to multiple different concrete implementations. In some implementations, the sales transaction:
  (1) Provides a uniform data model for pricing that acts as a prototype or template for any of multiple different types of objects across a computing platform, which may be across different business units, and which may include custom objects as well as standard objects.
  (2) Allows for easily mapping and transforming from one object type to another and providing an inherent platform defined field mapping.
  (3) Provides an implementation agnostic API object that acts as a first class API object that is returned from a pricing engine as part of the output.

Figure 4:
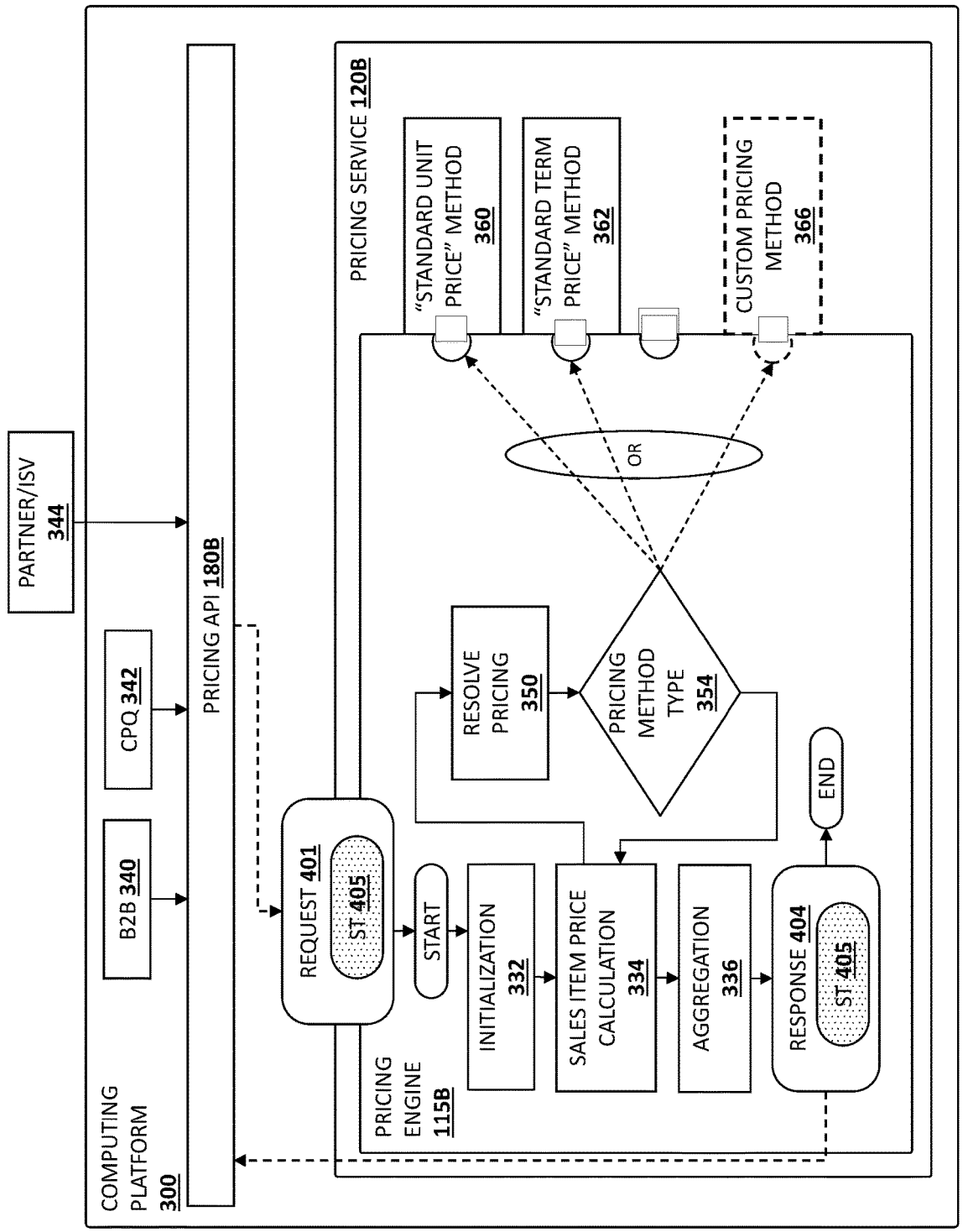
FIG. 4 illustrates a sales transaction implemented in an example pricing service.

FIG. 4 illustrates a computing platform including processing of pricing requests for sales transactions, according to some implementations. As illustrated, a computing platform 300 may provide multiple services including, but not limited to, the pricing service 120B to provide pricing operations for multiple different types of sales operations. The computing platform 300 may include numerous other operations and functions. As previously described, the pricing engine 115B operable within the pricing service 120B includes a getPrice function to determine pricing for one or more sales items in a sales transaction, the sales items being any combination of goods and services.

In some implementations, the pricing service 120B receives a pricing request 401 including a sales transaction 405 from a client. The client is to provide the sales transaction in the pricing request 401. Some implementations of the sales transaction 405 include a sales header and a set of sales items, as described below with respect to FIG. 4. The pricing service produces a pricing response 404, the pricing response including the sales transaction 405. In some implementations, the pricing engine 115B does not update the sales transaction 405 in the database (not shown) as a result of price calculations; the pricing service instead generates an output parameter while maintaining the input data of the sales transaction 405. The generation of output parameter may include providing reference to the input data, or cloning an input parameter of the sales transaction to generate the output parameter for the pricing results.

In some implementations, the computing platform 300 allows for mapping and transforming of a sales transaction 405 from one object type to another, the computing platform 300 to provide an inherent platform defined field mapping for the sales transaction. The sales transaction 405 acts a prototype for all objects in the computing platform 300, and represents an implementation agnostic API object. In operation, a uniform sales transaction 405 may be used in Cart Products to represent transactions for a buyer experience; Quote Items to represent transactions for a seller experience; Order Products for provisioning and changing orders; and Contract Headers to track services over time, make changes, and provide renewal. The sales transaction provides an abstract interface that may then be utilized in multiple operations, the interface including a uniform data model.

Figure 5:
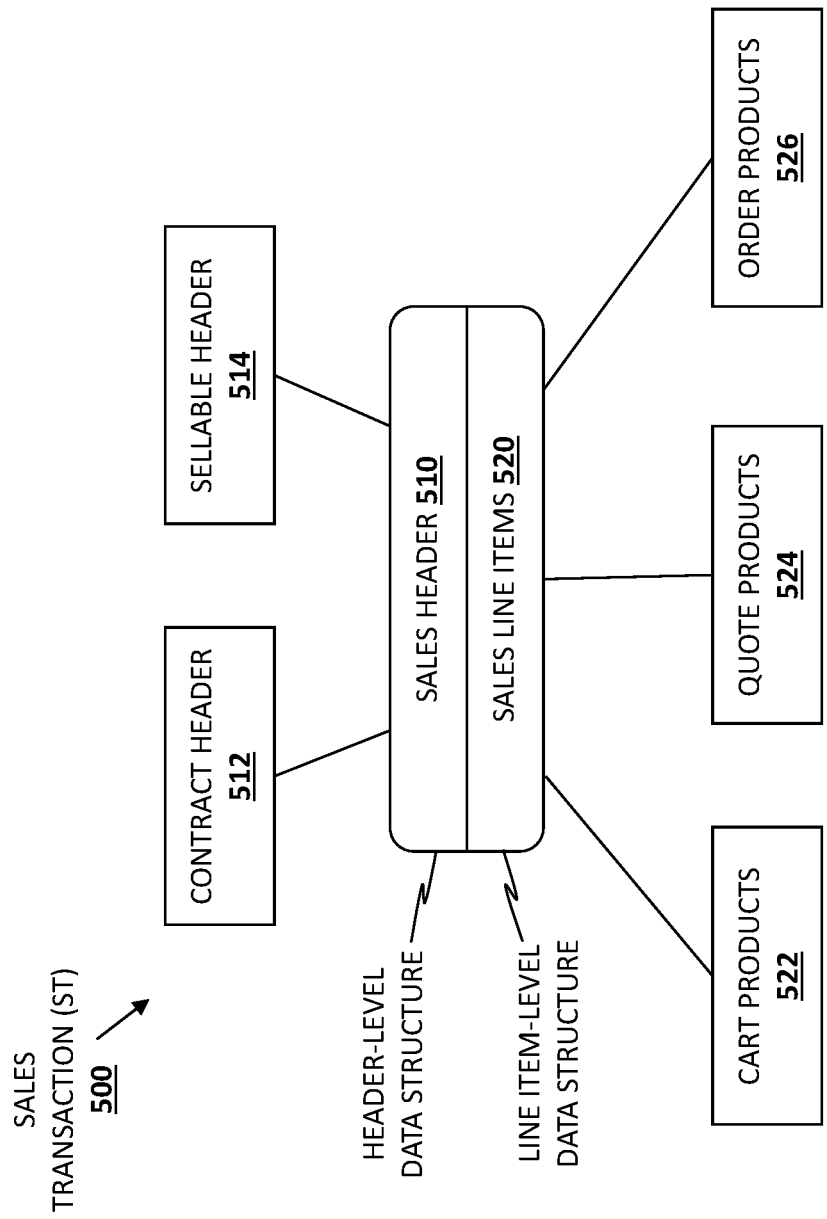
FIG. 5 illustrates an example of a sales transaction object used to implement sales transactions.

FIG. 5 illustrates a sales transaction for pricing operations, according to some implementations. A sales transaction 500 provides a uniform data model for use in pricing operations. In some implementations, the sales transaction 500 includes a sales header 510 and a set of sales line items 520 to represent the information used for a business to transact the sale of goods and services, with the sales header 510 and sales line items 520 being broken down into separate interfaces. In some implementations, the sales transaction 500 is maintained in processing by a pricing service 120B, thus providing a data model that is available in any operation. In some implementations, the sales transaction 500 further includes an input or output parameter for pricing operations.

The sales header 510 represents a header level data structure used in both a request and a response representing a particular sale operation, such as, for example, a Quote, a Cart, or an Order. As illustrated, the sales header may include, but are not limited to:
  (a) Contract Header 512 (for contract line items)—A contract header may be utilized for tracking contract services over time, and making changes and renewing as required.
  (b) Sellable Header 514 (for sellable line item)—A sellable header represents a generic header used by a platform API as an interface to use for external platform use cases. A sellable header may be used as a custom object for a customer's business process.

The sales line items 520 represent a line item level data structure in both a request and a response representing each sales items and quality for the sale operation. The sales line items may include, but are line limited to:
  (a) Cart Products 522 (representing cart line items—CartLineItem)—Cart products may be used primarily to represent transactions based on a buyer experience, i.e., the items in a sales cart for a prospective purchase.
  (b) Quote Products 524 (representing quote line items—QuoteLine)—Quote products may be used primarily to represent transactions based on a seller experience, i.e., to provide a quote for certain goods and services.
  (c) Order Products 526 (representing order line items—OrderProduct)—Order products may be used by operations and fulfillment to provision and change orders.

It is noted that a pricing request may be connected to additional constructs that affect the transaction, including, for example:
  (a) Price Adjustment Item—A construct to describe and define any positive or negative adjustments to the price to be applied at either the header level or for individual line items. The adjustment may be viewed as a discount, with a negative discount indicating that the customer incurs a charge and a positive discount indicating the customer receives a rebate.

(b) Tax Item—A construct that stores taxation based information. A price adjustment could also incur taxes so tax line items are related to individual line items or individual adjustments, which are in turn related to line items or the sales header (via an adjustment group).

Figure 6:
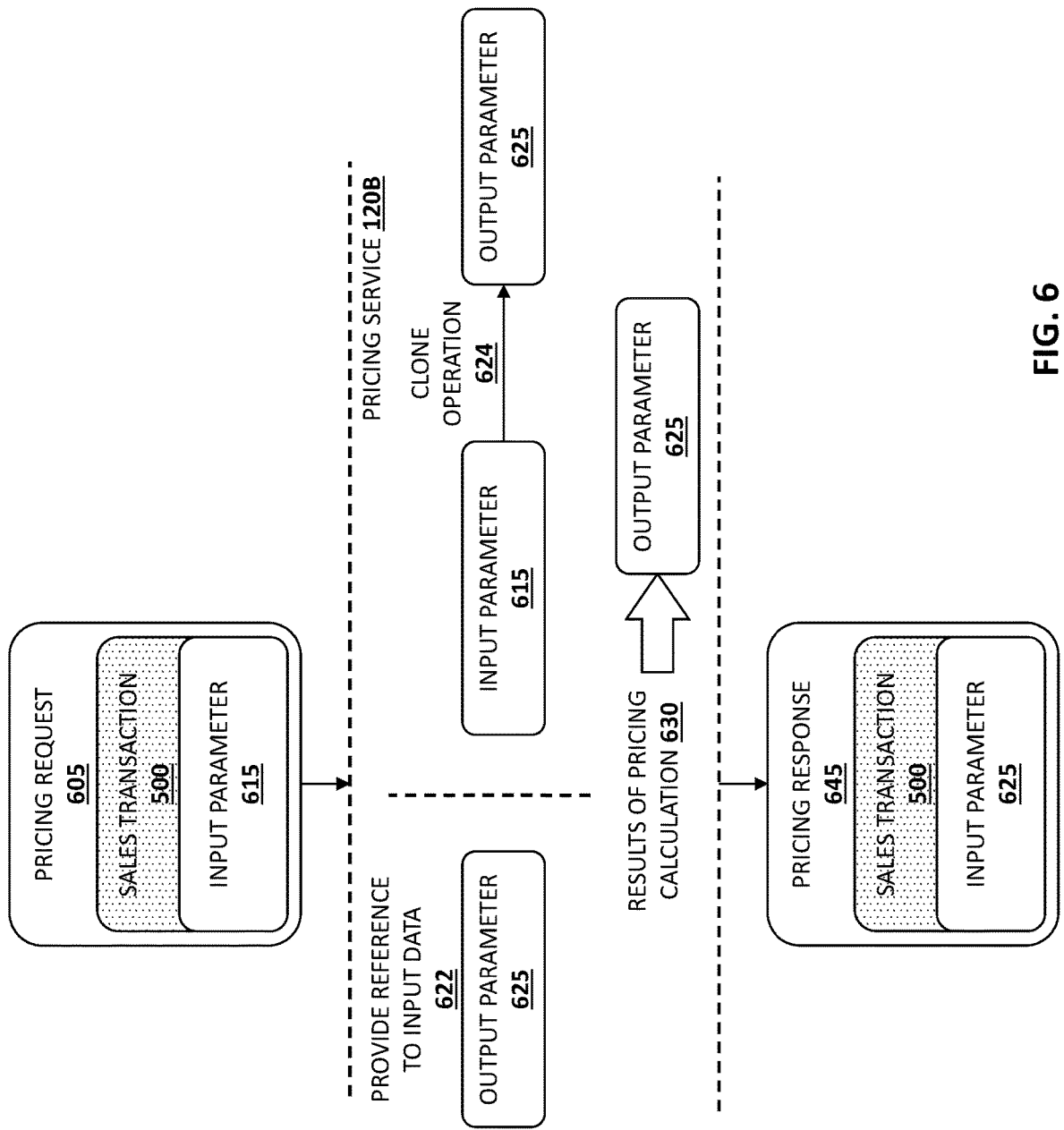
FIG. 6 illustrates cloning of input parameters and output parameters in an example sales transaction.

FIG. 6 illustrates processing of a pricing request including a sales transaction, according to some implementations. In some implementations, a pricing request 605, such as pricing request 401 illustrated in FIG. 4, includes a sales transaction 500 formatted in a uniform data model for use in pricing operations. In some implementations, the sales transaction 500 includes a sales header and a set of sales line items, as illustrated in FIG. 5, and an input parameter 615 representing the pricing request.

In some implementations, the pricing request 605 is directed to a pricing service in a computing platform for price calculation according to a particular pricing method based on the data indicated by the sales header and sales line items (e.g., as described with respect to FIGS. 3A-C). In some implementations, the input parameter 615 is immutable by the pricing service 120B in generating pricing of the sales transaction. In some implementations, the pricing service is to generate an output parameter 625 for pricing results utilizing the input parameter. In some implementations, the generation of the output parameter may include, but is not limited to, one or more of the following:

(a) The pricing service is to utilize reference 622 to the input data in the input parameter for the generation of the output parameter 625 for pricing results;

(b) The pricing service 120B is to clone 624 the input parameter 615 of the sales transaction 500 to generate the output parameter 625. The input and output parameters thus are separate objects, and the input parameter is unchanged.

The pricing service is then to insert the pricing results 630 resulting from the pricing operation into the output parameter 625, and to a generate a pricing response 645 including the sales transaction 500 including the output parameter 625. In this manner the pricing service 120B maintains the sales transaction 500 in the output, which includes the sales header 510 and sales line items 520 as illustrated in FIG. 5.

System and Method for a Scalable Pricing Engine

Some implementations include a pricing engine and associated pricing service which operate in a scale-mode pricing runtime, in which the pricing engine performs the various pricing operations described above at high-scale—as required to support business-to-consumer (B2C) implementations. A pricing engine operating in the scale-mode pricing runtime is sometimes referred to herein as a "scalable pricing engine" or a "high-scale pricing engine". The scale-mode pricing runtime is a horizontally elastic runtime backed by a high-scale distributed data service. Some implementations include both a scale-mode pricing runtime and a design time/low-scale mode pricing runtime which is also used for design time modifications and testing of the pricing service and pricing engine. In some implementations, the distributed data service ensures that the pricing data needed for performing pricing operations is copied or cloned from the primary database to distributed data storage locations in close proximity to the pricing operations performed by the pricing engine, thereby improving data access latency and reducing the load on the primary database. The primary database may be monitored to detect changes to the pricing data and invalidate and/or update corresponding pricing data in the distributed data storage locations. In at least some implementations, the distributed data service is a read-only service, so that various types of resource-intensive synchronization operations such as write transactions and database updates are not required. In addition, some implementations achieve horizontal scaling through controlled and strategic caching of the read-only pricing data across the pricing service.

The scalable pricing engine in the scale-mode pricing runtime includes a scalable pricing application programming interface (API) which reduces data traffic with endpoints by replacing redundant objects with object references and removing unnecessary data, thereby decreasing bandwidth consumption and improving scalability. An "endpoint" refers to any entity which establishes a connection with the pricing API for submitting pricing requests to the pricing service and receives pricing responses from the pricing API. These entities can include, but are not limited to, entities (e.g., services or users) internal to the provider of the pricing service and/or external to the provider of the pricing service (e.g., customers of the provider of the pricing service, which can include vendors or customers of those vendors).

In some implementations, such as for pricing operations requiring a large set of pricing data, an asynchronous pricing service subdivides the pricing operations into chunks and each chunk is dispatched as a separate pricing job for execution by the pricing engine in the scale-mode pricing runtime or, alternatively, the low-scale pricing runtime. The pricing engine asynchronously executes the plurality of pricing jobs and provides a corresponding plurality of partial results. The asynchronous pricing service performs derived pricing operations (if needed) and aggregates the partial results to produce a final result.

"Asynchronous" is used here to mean that the pricing engines execute the pricing jobs separately and independently (e.g., without the need for timing signals to coordinate execution). Consequently, the pricing engine will potentially start and/or complete processing each of the chunks at slightly different times, but should overlap execution of at least some of the pricing jobs. Thus, the processing of any two or more chunks over an interval of time may fully overlap, partially overlap, or not overlap (e.g., be processed by the pricing engine fully in parallel, partially in parallel, or not in parallel, respectively).

Some implementations are described that use organizationIDs to distinguish different "organizations" to which services are being provided. These organizations may be different entities (e.g., different companies, different departments/divisions of a company, and/or other types of entities), and some or all of these entities may be vendors that sell or otherwise provide products and/or services to their customers. While some implementations are described that use organizationIDs to distinguish different "organizations" to which services are being provided, other implementations could use a different identifier and/or provide identifiers at a greater, lesser, or different granularity level. An organization, which is assigned a unique organizationID, may include any entity or group of entities including, but not limited to, the provider of the pricing service; groups of users of the provider of the pricing service; customers of the provider of the pricing service, which can include vendors or customers of those vendors, as well as tenants in a multi-tenant system, and customers of those tenants. In at least some implementations, the organization is a B2C vendor tenant which offers products and/or services to its customers and which uses the scalable pricing engine described herein to provide pricing to its customers.

In some implementations, the pricing engine performs pricing operations by operating on various forms of pricing-related objects, such as Product objects, Pricebook objects, and PriceBookEntry objects. As used herein, a "Product" object is a catalog of items and/or services an organization sells. A product may contain one or more different sets of prices, indicated by PriceBookEntry objects. In some implementations, current or available Products are sometimes represented by the Product2 object.

A "Pricebook" object store a list of products and services sold by the organization, which typically has one standard price book that defines the standard or generic list price for each product or service. An organization can use custom price books that can be used for specialized purposes, such as a discount price book, price books associated with different markets, and price books for certain accounts. The standard Pricebook may be the only price needed, but if further Pricebooks are required, the standard price book can be referenced when setting up list prices in custom price books. Current or active PriceBooks are sometimes represented by the Pricebook2 object.

A "PricebookEntry" object is a product entry providing an association between a Pricebook2 object and Product2 object in a Pricebook. The PricebookEntry object allows products to be linked to a standard price book or a custom price book with a price for a given currency. In general, one Pricebook entry is linked to only one product, one Pricebook entry can only appear in one Pricebook, and one Pricebook entry can be used in multiple line items.

Figure 7:
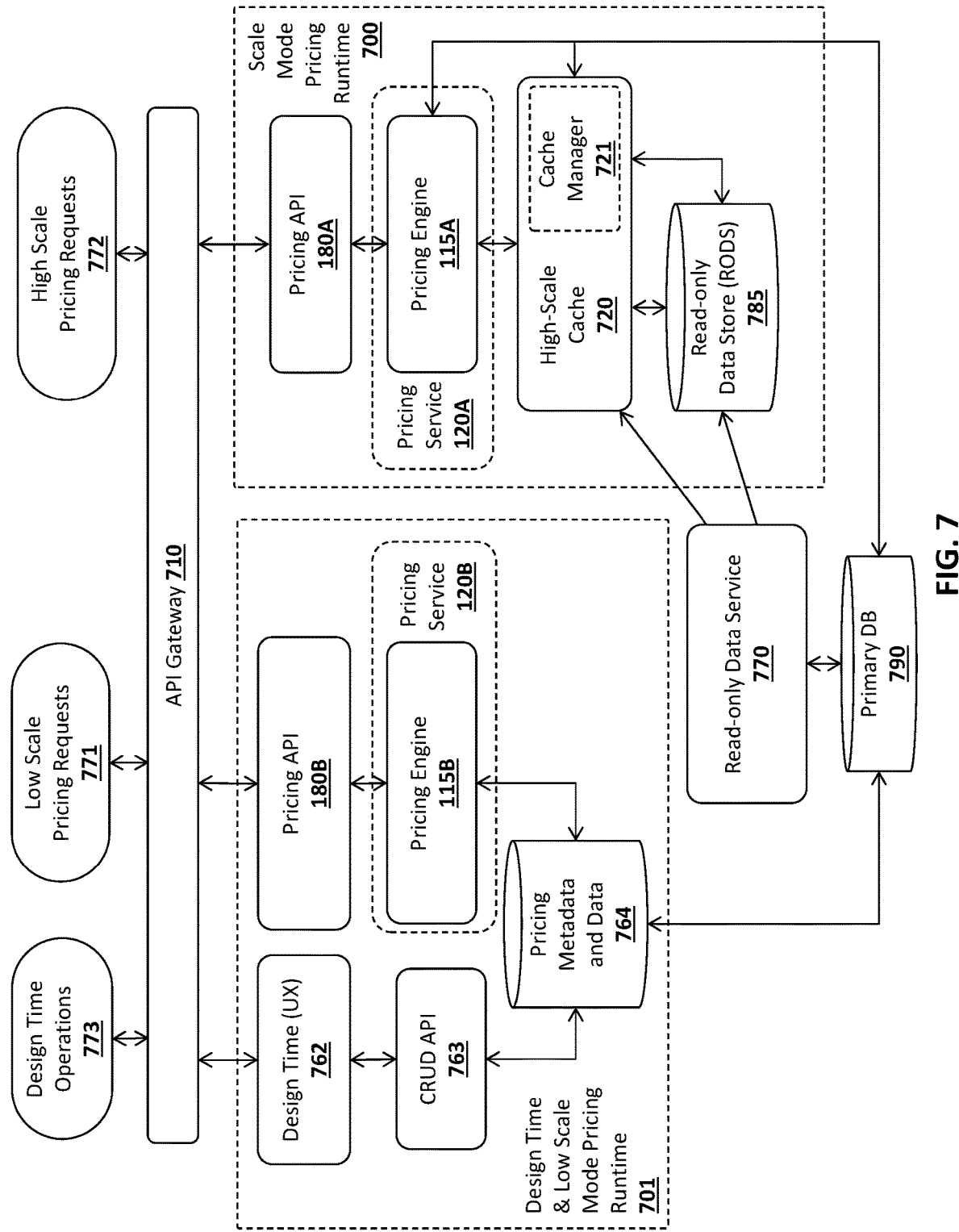
FIG. 7 illustrates an architecture which includes a low-scale pricing runtime and a scalable pricing runtime.

FIG. 7 illustrates an architecture in accordance with some implementations which includes both a design time/low-scale mode pricing runtime 701 and a scale-mode pricing runtime 700. The design time/low-scale mode pricing runtime 701 includes a pricing engine 115B (e.g., of one of the types described above, or other types) to perform pricing operations in response to low-scale pricing requests 771 received through a pricing API 180B (e.g., such as the B2B requests 340 and configure-price-quote (CPQ) requests 342 described above).

The pricing engine 115B performs the pricing operations using a repository of design time metadata and data 764 created and/or updated using a CRUD (create, read, update, and delete) API 763. In particular, in some implementations, a design time user experience (UX) interface 762 is provided, which translates design time operations 773 specified by the customer into sequences of commands such as create, read, update, and delete. The CRUD API 763 implements the commands by performing the corresponding operations on pricing data in the repository of pricing metadata and data 764.

When updates to the pricing metadata and data 764 are finalized, the pricing metadata and data 764 can be used by the pricing engine 115B for performing pricing operations within the design time/low-scale mode pricing runtime 701. In some implementations, the pricing metadata and data 764 is copied to a primary database 790 from which it can be also accessed by the pricing engine 115A in the scale-mode pricing runtime 700. The design time/low-scale mode pricing runtime 701 provides a design time environment and supports low-scale use cases which do not require the full gamut of features of the scale-mode pricing runtime 700. Implementations of the design time/low-scale mode pricing runtime 701 are flexible, metadata driven, and customizable, allowing a customer to test, author, and build out pricing implementations before deploying them to the high-scale mode pricing runtime 700, which is the production environment which their customers will use and consume.

In at least some implementations, the scale-mode pricing runtime 700 is a cloud-scale runtime environment used for business contexts such as business-to-consumer (B2C) contexts that must service requests at high-scale. This environment also has a high performance requirement where customer success is directly related to performance, as well as availability, scalability, and uptime. To support these requirements, the scale-mode pricing runtime 700 includes a pricing API 180A capable of servicing pricing requests 772 at very high request rates required for B2C implementations. In some implementations, the pricing API 180A dynamically scales up capacity in response to detected increases in pricing requests. Similarly, the API gateway 710 is dynamically scalable to support increases in data traffic directed to the various services running on the platform (including increases in pricing requests directed to the pricing service 120A). By way of example, and not limitation, at least one implementation of the API gateway 710 and pricing API 180A are configured to dynamically increase capacity to service peak request rates (e.g, between 10 million and 50 million requests/hour). The API gateway 710 forwards incoming requests to the appropriate destination services and transmits the responses from those services to requesting entities. For example, the API gateway 710 forwards pricing requests at high-scale to a pricing engine 115A through the corresponding pricing API 180A operating within the scale-mode pricing runtime 700. The pricing API 180A may also receive pricing requests from within the scale-mode pricing runtime 700 (e.g., from other entities such as services).

As illustrated in FIG. 7, in some implementations, the pricing engine 115A is encapsulated within the pricing service 120B. In these implementations, the pricing service 120B validates pricing requests received over the pricing API 180A (e.g., ensuring that each request is properly formatted) and may also initiate the transfer of pricing data from the read-only data store 785 or primary database 790 on behalf of the pricing engine 115A.

As described above, customers configure pricing metadata and data 764 to be used for high-scale use cases in the design time/low-scale mode pricing runtime 701, prior to listing the products on their site (e.g., setting up products and entering pricing data, adjustment data, catalog info, etc.). In some implementations, the pricing data is stored in the primary database 790 from which it can be accessed by the pricing engines 115A in the scale-mode pricing runtime 700. In some implementations, the pricing data is distributed across the scale-mode pricing runtime 700 by a read-only data service 770, which manages a read-only data store 785. In these implementations, the read-only data store 785 is a scalable database which is accessible at low latency to the scale-mode pricing runtime 700 and which provides read-only access to the pricing engine 115A.

In some implementations, a set of one or more servers that are running on server electronic devices and associated network resources are allocated to provide the elastic scalability of the scale-mode pricing runtime 700, including the pricing engine 115A, pricing API 180A, and read-only data store 785. The plurality of servers may be located within a datacenter or spread across multiple datacenters, potentially in geographically disperse locations. Regardless of location, the servers are coupled over the network resources to coordinate execution of the scale-mode pricing runtime 700. The particular number of servers and network resources required for implementing the scale-mode pricing runtime 700 may dynamically change based on the current pricing workload (e.g., number of requests received per hour) and the latency requirements for servicing pricing requests. Additional servers and network resources may be dynamically allocated to the plurality of servers in response to increased load (e.g., to ensure that latency is maintained below a specified threshold). Conversely, servers may be removed from the plurality of servers in response to decreasing load (e.g., and reallocated for providing other services or functions within the system). The server and network resource allocations may be performed by a load balancer, which monitors performance metrics associated with operation of the scale-mode pricing runtime 700 (e.g., request queue wait time, requests processed per unit of time, idle execution cycles, latency between requests and responses, etc) and makes server and network resource allocation and de-allocations accordingly.

In some implementations, a high-scale cache 720 services requests for pricing data from the high-scale pricing engine 115A to improve request latency. The high-scale cache 720 may be implemented as an in-memory distributed cache which coherently caches pricing data across the group of servers currently allocated to the scale-mode pricing runtime 700. In some implementations, a cache manager 721 controls access to the high-scale cache 720, storing new cache entries in response to pricing requests, invalidating entries containing stale/invalid data, and ensuring coherency with the read-only data store 785 and/or the primary database 790. In some implementations, the cache manager 721 comprises software executed by one or more servers (e.g., servers allocated to the scale-mode pricing runtime 700 as described above). However, some implementations of the cache manager 721 can at least partially be implemented on a hardware accelerator. Like the rest of the scale-mode pricing runtime (e.g., the pricing engine 115A and pricing API 180A), the high-scale cache 720 may be dynamically scaled based on pricing data traffic. For example, additional processing resources may be allocated to support the high-scale cache 720 in response to detected increases in pricing requests, and may be de-allocated in response to detected reductions in pricing requests.

While a single pricing engine 115A, read-only data store 785, and high-scale cache 720 are shown in FIG. 7, some implementations may achieve high scale with multiple instances of the pricing engine 115A, read-only data store 785, and high-scale cache 720, operable across the plurality of servers currently allocated to the scale-mode pricing runtime 700.

In some implementations, the cache manager 721 determines if the pricing data requested by the pricing engine 115A is available in the high scale cache 720 and, if not, performs a lookup for the pricing data in the read-only data store 785 (which stores the most current set of pricing data). To keep access latency as low as possible, the lookup is performed on a portion of the read-only data store 785 in close proximity to the pricing engine 115A and cache manager 721 (e.g., implemented on a server within the same datacenter as the pricing engine 115A).

The read-only data service 770 synchronizes the read-only data store 785 with the primary database 790. Synchronization may be triggered by one or more events such as a customer finalizing the pricing metadata and data 764 or portions thereof, within the design time/low-scale pricing runtime 701, thereby causing the data to be copied to the primary database 790. In at least some implementations, the primary database 790 stores the most current, valid version of the pricing metadata and data 764. In various implementations, the read-only data service 770 is implemented as a separate service or microservice which exposes a data synchronization API.

In some implementations, the read-only data service 770 pre-populates the read-only data store 785 and/or the high-scale cache 720 with pricing data likely to be requested by the pricing engine 115A (e.g., based on prior usage data, customer identification of the most relevant pricing data, etc). For example, the read-only data service 770 may perform bulk load operations to the read-only data store 785 and/or high-scale cache 720 for certain pricing data (e.g., certain products or categories of products). Before loading the pricing data to the read-only data store 785 and/or high-scale cache 720, the read-only data service 770 may perform validation checks on the pricing data to ensure that the associated product is active, that the pricing data is not archived or deleted, and/or that the pricing data is not stale.

As the pricing engine 115A performs pricing operations, in response to commands via the pricing API 180A, the cache manager 721 performs lookups for the pricing data, first in the high scale cache 720 which has the lowest access latency, and then in the read-only data store 785 or (if necessary) the primary database 790. To ensure that frequently used data is stored in the high-scale cache 720, the cache manager 721 creates new cache entries as it retrieves pricing data from the read-only data store 785 or the primary database 790 and may invalidate or evict one or more existing cache entries to free space in the high-scale cache 720 in accordance with a cache management policy. For example, the cache manager 721 may implement a least recently used (LRU) cache management policy which invalidates or evicts one or more cache entries in the high-scale cache 720 which have been accessed the least recently compared to other cache entries. In some implementations, each cache entry is assigned a time-to-live (TTL) value and any cache entries persisting past the TTL window are invalidated. Various other cache management policies or heuristics may be implemented in accordance with various implementations.

In some implementations, different portions of the pricing data are assigned different priorities. For example, certain portions of the pricing data may be related to highly popular products, or other products for which pricing data will frequently be needed. These portions of the pricing data may be assigned a high priority (or highest priority), to ensure storage in the high-scale cache 720. For example, in some implementations, high priority (or highest priority) pricing data will be bulk loaded or prefetched into the high-scale cache 720 ahead of other portions with relatively lower priorities.

In some implementations, the cache manager 721 identifies cache entries to evict based, at least in part, on pricing data priorities. For example, those portions of the pricing data set to the highest priority may automatically be maintained in the high-scale cache 720 whereas portions set to the lowest priority may be invalidated before any other pricing data, or may never be stored in the high-scale cache 720. By way of example, and not limitation, the LRU policy described above may be implemented using only the lowest priority cache entries first, and only then move on to using the LRU policy on cache entries at the next-to-lowest priority, and so on. The cache manager 721 may perform cache invalidations and/or invalidations within the read-only data store 785, not only to free space, but also when a portion of the cached data becomes stale (e.g., when one of the values changes within the primary database 790).

In some implementations, the read-only data service 770 transmits a notification to the cache manager 721 and/or updates relevant pricing data in the read-only data store 785 when pricing data in the primary database 790 has been modified. The notification to the cache manager 721 may take the form of an invalidate command uniquely identifying the relevant portions of the pricing data (e.g., via one or more cache keys as described below). In response, the cache manager 721 uses the cache keys to locate and invalidate the relevant entries in the high-scale cache 720. Various events triggering invalidation of cache entries are provided below.

In various implementations, each entry in the high-scale cache 720 can be uniquely identified with a specific cache key such as <organizationId, price2Id> which is used by the cache manager 721 to precisely locate specific entries of the high-scale cache 720 when performing lookups on behalf of the pricing engine 115A and when performing invalidations of cache entries. In these implementations, the OrganizationID value, which is unique to each organization, is combined with another data field (e.g., Product2Id, Pricebook2Id) to form a cache key used to identify corresponding pricing entries in the high-scale cache 720. In general, cache key generation may be represented as <OrganizationId, ObjectID]> where ObjectID is the pricing object associated with specific pricing data for the organization.

This design of the cache key and cache entries provides for optimized cache queries and allows individual cache entries to be invalidated without unnecessarily invalidating other cache entries. For example, the combination of OrganizationId with specific pricing objects allows a specific cache entry containing particular pricing data to be efficiently located and/or invalidated.

In certain implementations, the cache key used to perform lookups in the high-scale cache 720 includes one or more of the following fields: "OrganizationId, Pricebook2Id, Product2Id, ProductSellingModelId, CurrencyIlsoCode", where Product2Id identifies the product, Pricebook2Id identifies the current Pricebook from which the price is determined, and ProductSellingModeId identifies the model of the product (if applicable).

In some implementations, the pricing data stored in each cache entry, identified by its cache key, includes one or more of the following fields: "UnitPrice, IsActive, IsArchived, IsDeleted, List<String> priceAdjSchIds", where UnitPrice indicates a current price, IsActive indicates if the price is active, IsArchive indicates whether the price is archived, IsDeleted indicates if the price entry has been deleted (e.g., in the primary database 790), List<String> provides a descriptive string associated with the product, and PriceAdjSchIds identifies any operative price adjustment schedules associated with the product pricing.

In some implementations, the cache availability of Pricebook data is determined using:
 Cache Key—"OrganizationId, Pricebook2Id"
 Cache Value—"IsActive,IsArchived,IsDeleted,ValidFrom,ValidTo"
In these implementations, the cache availability of data for a product is determined using:
 Cache Key—"OrganizationId, Product2Id"
 Cache Value—"IsActive,IsArchived,IsDeleted" The cache availability of a particular price adjustment schedule is determined using:
 Cache Key—"OrganizationId, PriceAdjustmentScheduleId"
 Cache Value—"IsActive,Type,Priority, Description, Name,AdjustmentMethod,TiersIf where Tier=LowerBound, UpperBound, Type, Value In some implementations, Update, Delete, Undelete, or Archival operations on a Pricebook entry within the primary database 790 automatically triggers the cache manager 721 to invalidate of the corresponding entries in the high-scale cache 720. Similarly, the cache manager 721 invalidates the corresponding cache entry in response to detecting the following operations, and combinations of operations:

PricebookEntryAdjustment: Any Insert, Update, Delete, or Undelete operations associated with PricebookEntryAdjustment causes the cache manager 721 to invalidate the associated cache entries in the high-scale cache 720.

PriceAdjustmentSchedule: The cache manager 721 also invalidates corresponding high-scale cache entries in response to Delete, Undelete, or Update for Active entries associated with PriceAdjustmentSchedule data.

When PriceAdjustmentSchedule is deleted, PricebookEntryAdjustment is deleted. When PriceAdjustmentSchedule is undeleted PricebookEntryAdjustment is undeleted.

When subscriptionsEnabled is enabled, and when PriceAdjustmentSchedule is inactivated, PricebookEntryAdjustment is inactivated. However, when PriceAdjustmentSchedule is activated, the associated PricebookEntryAdjustments are not re-activated. Hence, invalidation of the high-scale cache entry is only needed when PriceAdjustmentSchedule is updated from true to false but not from false to true.

When subscriptionsEnabled is not enabled, and when PriceAdjustmentSchedule is inactivated PricebookEntryAdjustment is inactivated. When PriceAdjustmentSchedule is activated PricebookEntryAdjustment is activated.

Pricebook2: When the Archived flag is set, the cache manager invalidates in response to Delete, undelete, and Update operations on Pricebook data. When a Pricebook2 record is deleted, the PricebookEntry is deleted. When Pricebook2 record is undeleted, the PricebookEntry is undeleted.

When a Pricebook2 record is inactivated, the PricebookEntry is NOT inactivated. When Pricebook2 is activated, the PricebookEntry is NOT activated. When the Pricebook2 record is archived, the PricebookEntry is archived.

Product2: The cache manager 721 invalidates the corresponding high-scale cache 720 entry on Delete, Undelete, and Update of Product2 pricing data. When the Product2 record is deleted, the PricebookEntry is deleted. When Product2 record is undeleted, the PricebookEntry is undeleted. When the Product2 record is inactivated, the PricebookEntry is inactivated. When Product2 is activated, the PricebookEntry is activated. When Product2 is archived, PricebookEntry is archived.

FIG. 8 illustrates a method for a scalable pricing engine in accordance with various implementations. The method my be implemented on the various system architectures described herein, but is not limited to any particular system architecture.

At 801, new or updated pricing metadata and data is received within the low scale runtime environment (e.g., design time/low-scale pricing runtime 700). For example, a customer may make changes to pricing data from within this low scale environment. At 802, pricing operations are performed at low scale using the new/updated pricing metadata and data. For example, the customer may test or otherwise run the pricing engine using the new data at low scale.

When the pricing data is ready for high-scale, determined at 803, the pricing is updated in the primary database at 804. In this implementation, the primary database is a central data repository storing the most current versions of the pricing data.

At 805, the pricing data is distributed to one or more read-only data store locations from which it can be used for high-scale pricing operations. At 806, high-scale pricing operations are performed using the pricing data in the read-only data store locations. As the data is used, at 807, entries for the data are created in a high-scale cache accessible to the high scale pricing operations. Certain existing cache entries may be invalidated/evicted in accordance with a cache management policy.

If a change to the pricing data is detected at 808, then a notification/invalidation command is transmitted to the read-only data store locations and/or the high scale cache at 809. In response, at 810, relevant portions of the pricing data are invalidated from the read-only data store and/or the high-scale cache.

Figure 9:
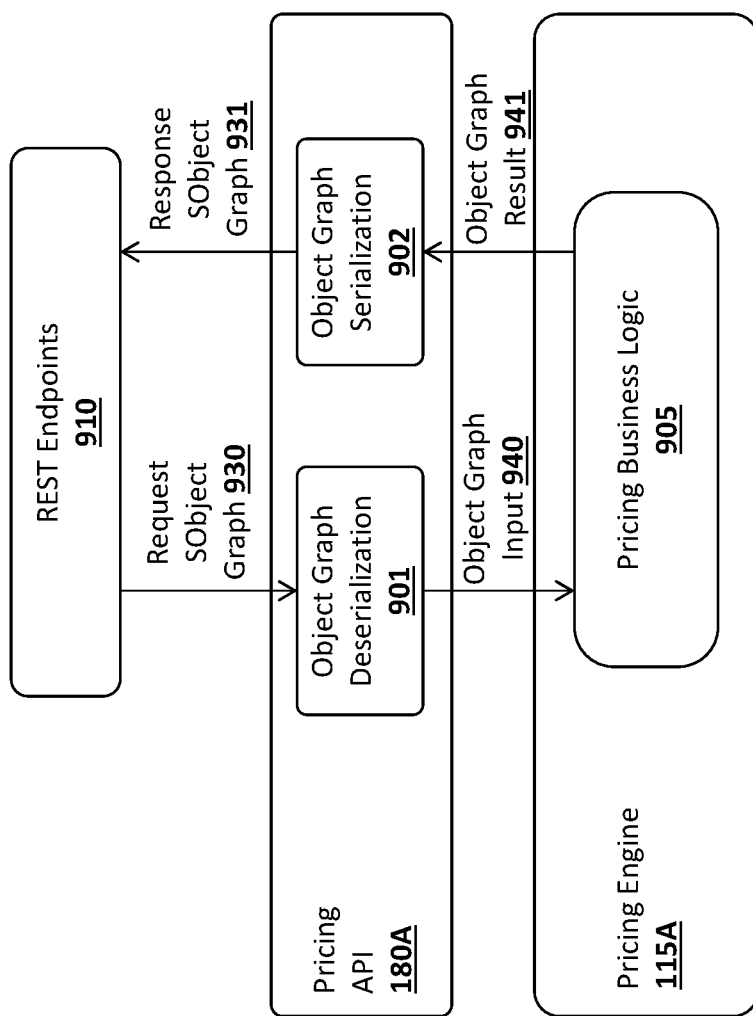
FIG. 9 illustrates a pricing application programming interface (API) in accordance with various implementations.

Referring to FIG. 9, in some implementations, the pricing API 180A (e.g., such as pricing API 180A in FIG. 7) is a representational state transfer (REST) API which supports serialized hierarchical object representations (SObjects), including SObject graph or trees structures. In these implementations, a REST endpoint 901 initiates a pricing transaction by submitting a request to the pricing API 180A in the form of an SObject graph 930 and receives the response as an updated SObject graph 931. In some implementations, the request and response SObject graphs are serialized representations of the SalesTransaction object graph 500 described above with respect to FIG. 5. The SObject graphs may be formatted in accordance with JavaScript Object Notation (JSON), although implementations of the invention are not limited to this specific data interchange format.

The illustrated REST endpoint 901 in these implementations may be any entity which establishes a connection with the pricing API for submitting pricing requests to the pricing service and receiving pricing responses from the pricing API. As previously described, these entities can include, but are not limited to, entities (e.g., services or users) internal to the provider of the pricing service and/or external to the provider of the pricing service (e.g., customers of the provider of the pricing service, which can include vendors or customers of those vendors), or any other entity capable of submitting a valid pricing request and receiving a valid response.

In some implementations, object graph deserialization logic 901 constructs an object graph 940 based on the request SObject graph 930 and submits the object graph 940 to the pricing engine 115A. Pricing business logic 905 of the pricing engine 115A accepts the object graph 940 as input, performs the requested pricing operations, and updates fields/objects of the object graph to produce an object graph result 941 containing the results. It returns the updated object graph 941 to the pricing API 180A and object graph serialization logic 902 serializes the updated object graph 941 and transmits the serialized SObject graph to the REST endpoint 910.

In a high scale environment such as the scale-mode pricing runtime 700 described herein, there may be thousands of SObject graph requests and responses occurring within a short period of time. It would therefore be beneficial to reduce the amount of data required for each request SObject graph 930 and response SObject graph 931.

In some implementations, the pricing API 180A performs data reduction operations to limit the data required for the request/response SObject graphs used for pricing transactions. For example, in some implementations, the object graph serialization logic 902 and object graph deserialization logic 901 implement an efficient SObject graph representation specifically designed for pricing operations to reduce the amount of data transmitted between the REST endpoints 910 and the pricing API 180A. In at least one implementation, the object graph serialization logic 902 removes redundant graph objects in the graph structure and flattens out the JSON payload when serializing the object graph result 941 to generate the SObject graph 931. For example, in these implementations, the object graph serialization logic 902 removes redundant objects in the graph structure. After identifying the redundant objects, the object graph serialization logic 902 encodes only one instance of the object and replaces the redundant instances with references to the one instance.

Figure 10:
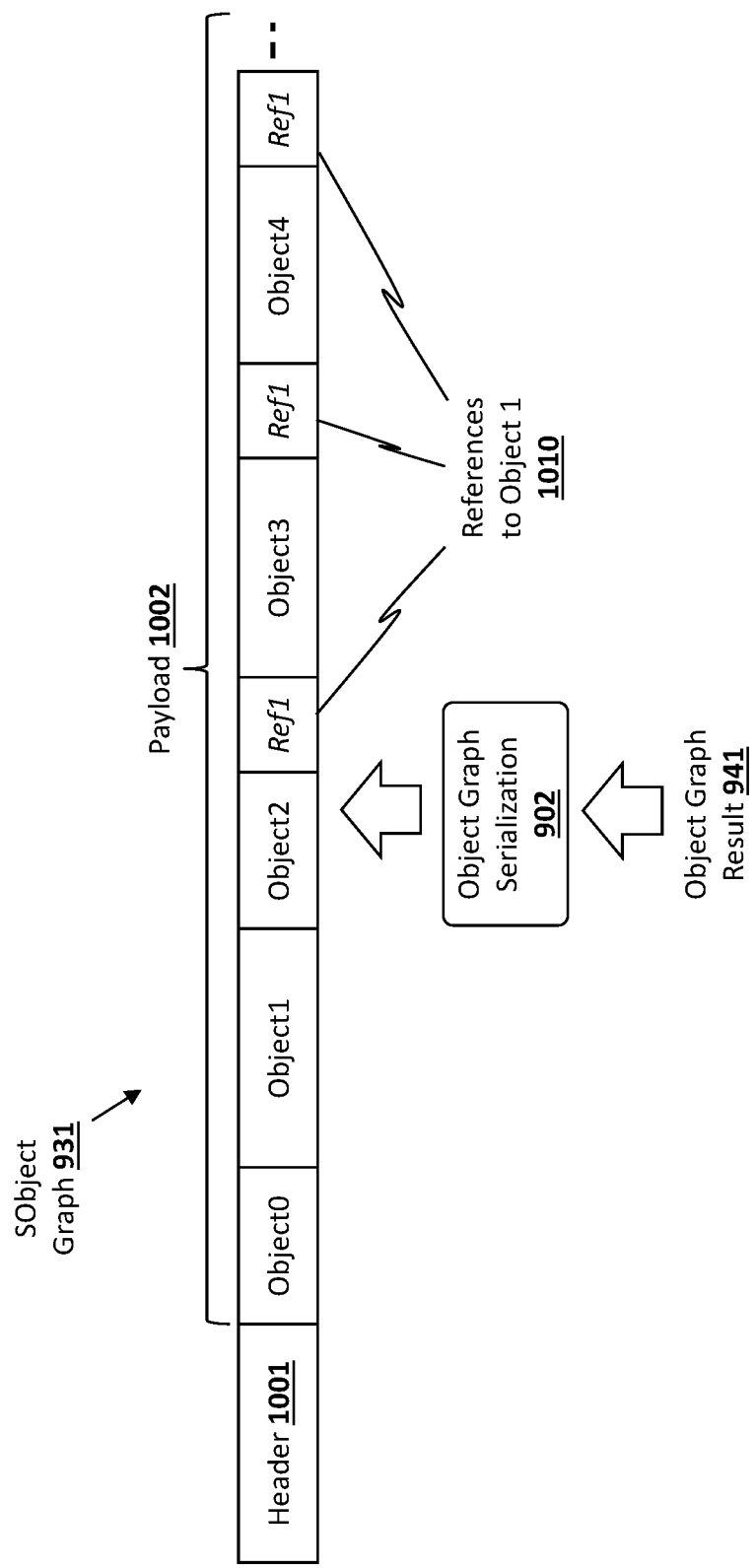
FIG. 10 illustrates a serialized object graph in accordance with some implementations.

FIG. 10 illustrates a representation of an SObject graph 931 generated by the object graph serialization logic 902 in accordance with various implementations. The SObject graph 931 includes a header 1001 (e.g., a JSON header) and a payload 1002 comprising code sequences associated with various serialized objects (Objects 1-4), each of which has a unique Reference ID value. In this example, the object graphics serialization logic 902 replaces three instances of Object 1 in the payload 1002 with the Reference ID associated with Object 1 (Ref1), thereby significantly reducing the amount of data required to encode the payload 1002.

Upon receiving the SObject graph 931, deserialization logic on the REST endpoint 910 (or the object graph deserialization logic 901 if the SObject graph 931 is a request 930) interprets the Ref1 fields as Object1 when reconstructing the hierarchical set of objects identified in the SObject graph 931.

Notably, rather than using a basic tree structure, the SObject graph 931 described above is a special kind of tree structure with cycles or loops, which provides for more significant data reduction. For example, consider the following simple tree JSON structure for Orders, OrderItems and OrderDeliveryGroups:

```
Order = {
    Id : "ref1",
    OrderDeliveryGroups {
        OrderDeliveryGroup1: {
            Id: "ref2",
            OrderItems {
                OrderItem1 : { // duplicated below
                    Id: "ref3"
                    Product: "0t1xx0000000000"
                    Quantity: "3"
                }
            }
        }
    },
    OrderItems {
        OrderItem1 : {
            Id: "ref3"
            Product: "0t1xx0000000000"
            Quantity: "3"
        }
    }
}
```

In the above code sequence which uses a tree structure, the object reference OrderItem1 is duplicated. In contrast, the corresponding graph structure removes this redundancy (thereby reducing data) and provides a flattened representation of the object structure:

```
        Order = {
            Id: "ref1",
        },
        OrderDeliveryGroup1 {
            OrderId: "ref1",
            Id: "ref2"
        },
        OrderItem1 {
            OrderId: "ref1",
            OrderDeliveryGroupId: "ref2",
            Id: "ref3",
            Product: "0t1xx0000000000"
            Quantity: "3"
        }
```

In composite graphs, which are sometimes used to execute a series of REST API requests, each encoded object is associated with a separate URL and HTTP method. In contrast, in at least some implementations, the SObject graphs generated by the object graph serialization logic 902 and received by the object graph deserialization logic 901 associates a single URL and HTTP method with all encoded objects within the request or response, thereby reducing data consumption and removing unnecessary complexity. The following is an example of a single URL and HTTP method which is specified at the top level of the SObject graph and associated with all objects in the payload:

URL: /services/data/v50.0/commerce/calculate-price

METHOD: POST

As mentioned, the object graph serialization logic 902 generates an SObject graph response 931 based on the results provided from the pricing engine 115A. In addition, in some implementations, each object encoded in the SObject graph response 931 may or may not have an associated error generated by the pricing business logic 905. In some implementations, this error is also encoded in the response 931. Furthermore, in certain implementations, the SObject graph response 931 may include a ReferenceId corresponding to the input S Object graph 930 and a singular HTTP status code which indicates the status of the overall pricing operation. The following is an example of an SObject graph response 931 which includes all of these features:

```
{
    "graphResponse" : [
        {
            "graphId" : "graph1",
            "response" : [
                {
                    response1;
                },
                {
                    response2;
                }
            ],
            "httpStatusCode" : "201"
        }
    ]
}
where response =
{
    "body": {
        "field1" : "value1",
        "field2" : "value2",
        "field3" : "value3",
        ...
        "fieldn" : "valuen",
    },
    "referenceId": "actual_reference_id",
    "success" : true/false,
```

```
    "error" : {
        "errorMessage" : " ",
        "errorCode" : " "
    }
}
```

Figure 11:
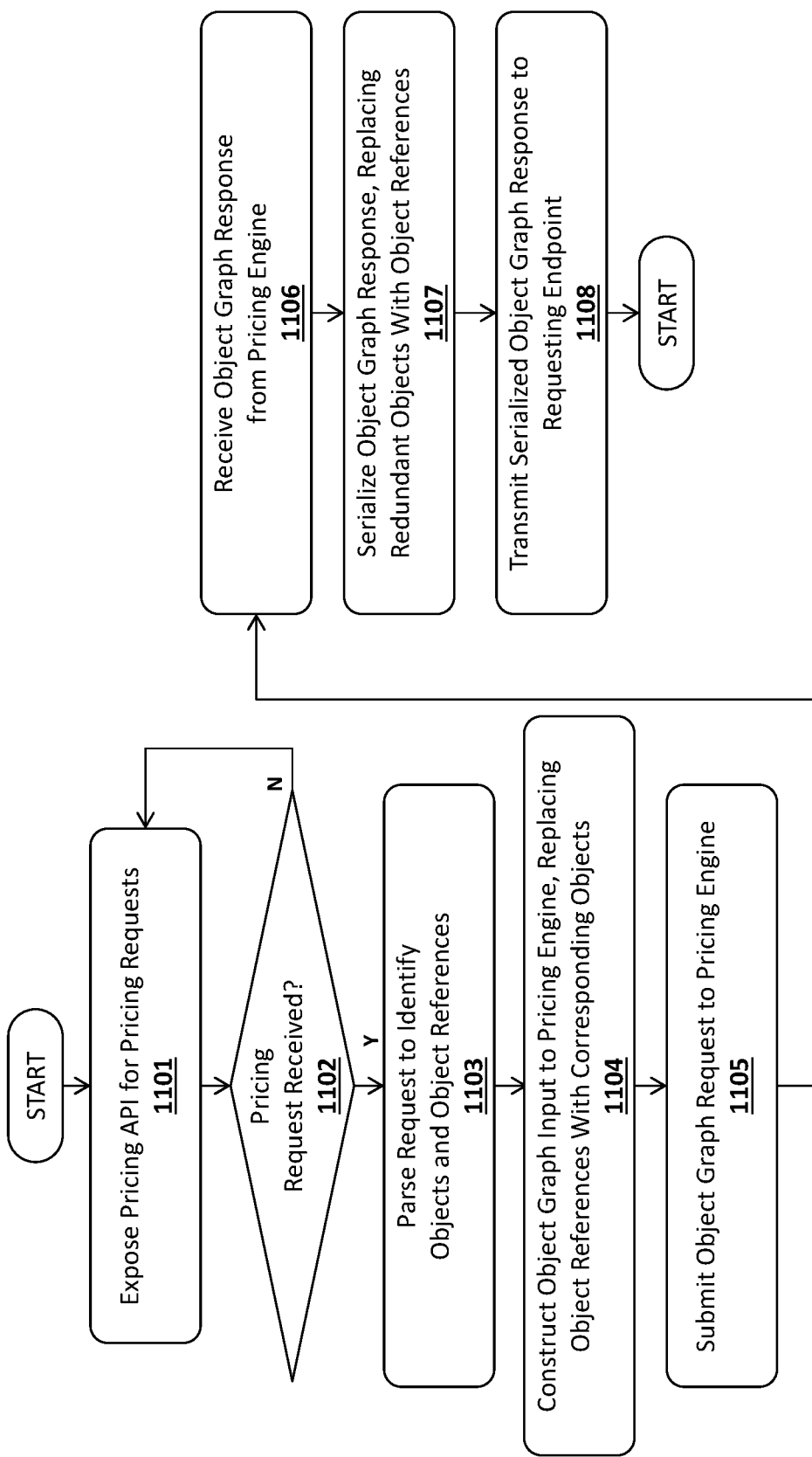
FIG. 11 illustrates a method for processing serialized object graphs in accordance with some implementations.

FIG. 11 illustrates a method for serializing and deserializing pricing engine requests and responses in accordance with various implementations. The method my be implemented on the one or more of the system architectures described herein, but is not limited to any particular architecture.

At 1101, the pricing API is exposed to receive pricing requests. In one implementation, pricing API is the API gateway 710 in FIG. 7, which is exposed after the relevant pricing data has been finalized. When a pricing request is received, determined at 1102, it is parsed at 1103 to identify objects and object references contained therein.

At 1104, an object graph is constructed as input to the pricing engine based on the request. For example, object references included in the request are replaced with the objects they reference to reconstruct the hierarchical relationship between the objects. At 1105, the constructed object graph is submitted as a request to the pricing engine.

At 1106, an object graph response is received from the pricing engine. As mentioned, in some implementations, the object graph response has the same structure as the object graph request, with certain fields/objects updated. At 1107, redundant object in the object graph response are removed in favor of object references and the object graph is serialized. At 1108, the serialized object graph response is transmitted to the REST endpoint which made the pricing request.

Figure 12:
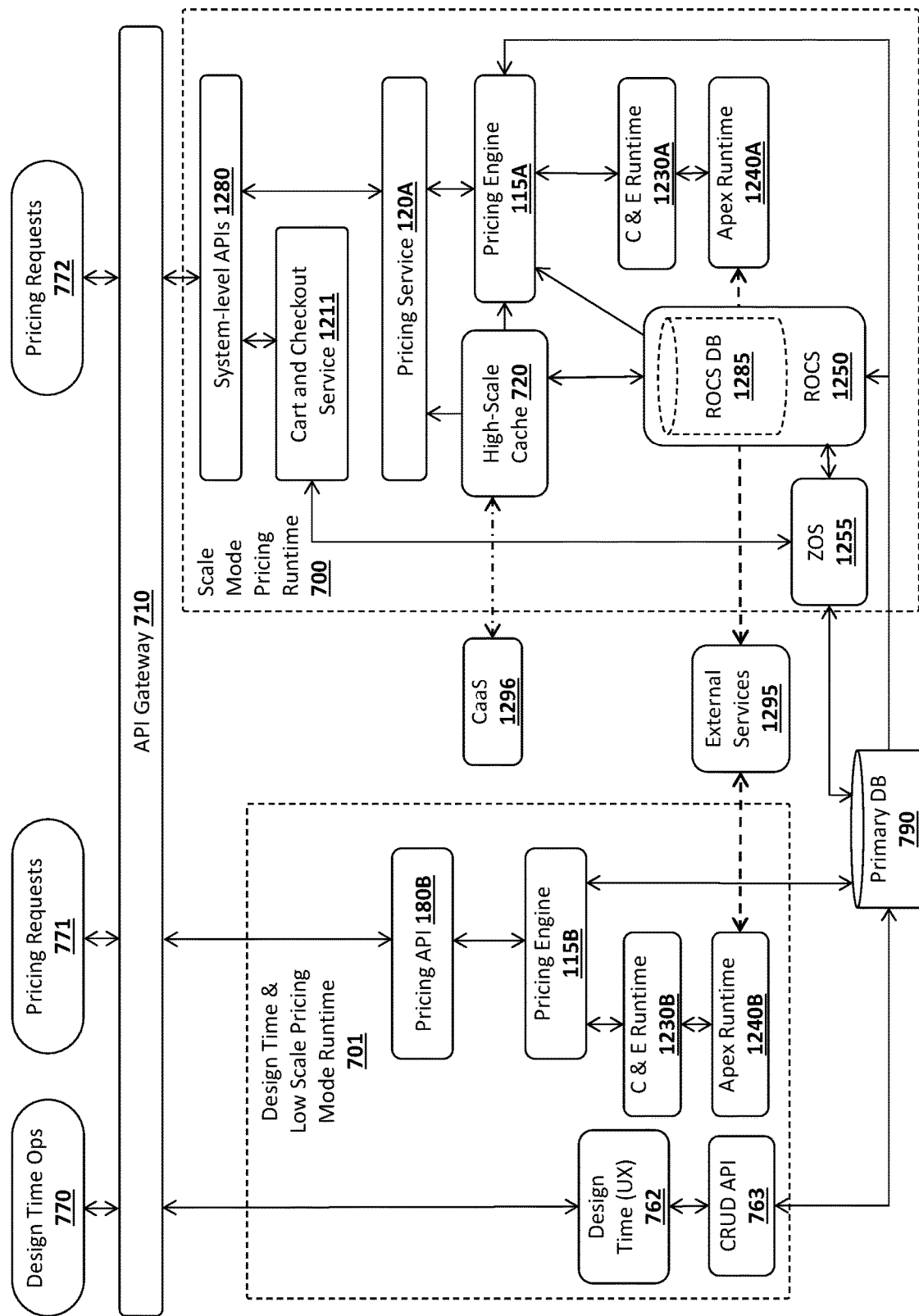
FIG. 12 illustrates additional details for implementations of the low-scale pricing runtime and a scalable pricing runtime.

FIG. 12 illustrates additional details of certain implementations of the design time/low-scale pricing mode runtime 701 and scale-mode pricing runtime 700. The pricing engines 115A-B are shown within the context of a larger group of services including high-scale distributed data management services, e-commerce services, and external data services. Each request directed to a service is received via the API gateway 710 and forwarded to one of the system-level APIs 1280 associated with the respective service (e.g., the cart and checkout service 1211 and pricing service 120A). While a single system-level APIs block 1280 is shown in FIG. 12 for simplicity, each service may have its own API. For example, the system-level APIs 1280 include the pricing API 180A for requests directed to the pricing service 120A and a cart and checkout API (not shown) associated with the cart and checkout service 1211.

Each service of the larger group of services may be a service 1842 as described with respect to FIG. 18B below. In some configurations, each service may be implemented as a set of software instances, such as software instance 1802 in FIG. 18A, which operate together to provide the functionality of the respective service. In some implementations, the software instances associated with a particular service are included in a software container associated with the service (e.g., software containers 1804A-1804R in FIG. 18A). In at least some implementations, however, a service may be implemented with software instances from multiple software containers.

In these implementations, a Read Only Clones for Scale (ROCS) service 1250 uses horizontal traffic partitioning to offload select read-only work from the primary database 790 by proactively cloning portions of the required pricing data in the ROCS database 1285 (sometimes referred to as the "local standby" database). This arrangement scales capacity by offloading read traffic from the primary database 790 to the read-only ROCS database 1285. Thus, the ROCS service 1250 is a specific implementation of the read-only data service 770 in FIG. 7.

As previously described, for B2C use cases, and during certain events such as flash sales, most or all of the setup and editing of pricing data is performed through the design time UX 762 and CRUD API 763 of the design time/low-scale pricing mode runtime 701, and stored in the primary database 790 (as described with respect to FIG. 7), prior to listing the products.

In these implementations, the pricing engine 115A operating in the scale-mode pricing runtime 700 is configured to generate queries to fetch pricing data from the ROCS DB 1285, when available, offloading traffic from the primary database 790. To avoid redundant roundtrips to the databases 785, 790 and improve the latency of the pricing engine 115A requests, the high-scale cache 720 caches portions of the pricing data as previously described. In some implementations, the high-scale cache 720 comprises one component in a larger high-scale cache service, represented by CaaS (cache as a service) 1296.

On environments where the ROCS DB 1285 is available, the high-scale cache 720 is populated directly from the ROCS DB 1285. Furthermore, the cache keys and the objects that are loaded into the cache are optimally formatted as described herein to ensure that the runtime path of the pricing engine 115A loads objects from the high-scale cache 720 in the least amount of time possible, providing a low latency, high throughput abstraction for sub-millisecond data lookup. The design of the cache key and cache objects offers a highly optimized object mode allowing individual cache entries to be precisely invalidated, without unnecessarily invalidating other cache entries.

In some implementations, the ROCS service 1250 tracks data accesses from the ROCS DB 1285 and the primary DB 790 and may adjust the location from which the pricing engine 115A reads pricing data. For example, if the ROCS service 1250 detects that traffic on the primary database 790 is light while the traffic on the ROCS DB 1285 is heavy, it may temporarily re-route pricing data requests to the primary DB 790. When it detects that traffic at the primary DB 790 has risen above a threshold, it may then route pricing data requests to the ROCS DB 1285.

In making decisions on whether to re-route pricing data requests, the ROCS service 1250 may also evaluate the latency associated with requests sent to the primary DB 790 compared to the latency of requests serviced by the ROCS DB 1285 and choose between one or the other only if the choice does not result in an unacceptable latency.

Also shown in FIG. 12 is a "Zero Object Service" (ZOS) 1255, a low latency, scalable, document-driven database microservice which stores and communicates data as key-value pairs. While the pricing engine 115A of the pricing service 120B is limited to read-only operations when accessing pricing data, the ZOS 1255 provides write capabilities for other services running alongside the pricing engine 115A in the scale-mode pricing runtime 700. In these implementations, the ZOS 1255 performs storage, retrieval, and data coherency operations within the scale-mode pricing runtime 700. For example, the ZOS 1255 is configured to detect when pricing data is changed within the primary database 790 and provide real-time updates to the ROCS DB 1285 and/or high-scale cache 720, thereby ensuring that the pricing data in the scale-mode pricing runtime 700 is current.

In some implementations, the additional services include customizations and extensions runtimes 1230A and 1230B provided in both the design time/low-scale runtime 701 and scale-mode pricing runtime 700, respectively. The customizations and extensions runtimes 1230A-B provide entity-specific customizations and extension points which are exposed only to specific entities such as customers making custom changes to the operation of the customers' implementation of the pricing service 120B/pricing engine 115A. For example, a particular customization may control the pre-loading of pricing data into a local database (e.g., the ROCS DB 1285) on a particular weekly or monthly schedule.

In various implementations, Apex runtimes 1240B and 1240A are provided in both the design time/low-scale runtime 701 and scale-mode pricing runtime 700, respectively, to (among other things) provide access from external services 1295. With respect to the pricing engines 115A-B, the Apex runtimes 1240A-B expose a pricing function interface allowing customers to create custom pricing functions. For example, the custom pricing method 366 described above with respect to FIG. 3A includes a mixture of custom and standard pricing functions, and specifically one or more custom pricing functions 392 including a Get Product List Price 371, which is represented by a custom Apex class 394 provided via the Apex runtimes 1240A-B.

In some implementations, data templates are built into ZOS 1255 as system-defined abstract types that define basic shapes (objects, fields, relationships) and behaviors (how CRUD operations map to key/value store operations) for common use cases. When ZOS 1255 receives a CRUD operation it first retrieves the object definition as before (unless already cached). It then resolves the baseType to one of the built-in abstract types. The abstract types have special processors associated with them that overwrite the default processor behavior.

Implementations of Asynchronous Pricing

It is possible for a single pricing transaction or quote to contain 1000s of line items. For example, an airline operator may submit a pricing request related to customization options for a Boeing 777 airplane. Each customization is a single product in their transaction. There could be 1000s of products involved in the transaction (e.g., lights, electrical systems, cabin seating, engine capacity, fuel capacity, fuselage configurations, paint, trim, color, etc.). Pricing such large transactions requires significant resources in terms of time, memory, database and computational power.

In some implementations, pricing operations are performed asynchronously for large pricing transactions, such as sales transactions containing hundreds of thousands of sales transaction items. An asynchronous pricing service operates with a separate asynchronous pricing API through which large pricing transactions are specified. In some implementations, an asynchronous pricing scheduler operable within the asynchronous pricing service subdivides very large pricing transactions (e.g., above a threshold number) into a plurality of chunks and specifies a corresponding plurality of pricing jobs to execute the plurality of chunks. The plurality of pricing jobs are queued for the pricing service 120A, which independently executes the jobs on the pricing engine 115A. The plurality of jobs are sometimes referred to as "child" jobs, with the "parent" job being the overall asynchronous pricing job. The pricing service 120A is notified of the queued jobs and causes the pricing engine 115A to independently execute the jobs, with at least partially overlapping execution, to generate the partial pricing results.

In an alternate or additional implementation, a pricing engine is operative within the asynchronous pricing service to execute the plurality of jobs on the plurality of chunks. In either implementation, when performing asynchronous pricing work, the pricing engine performs writes to the primary database to store the partial pricing results.

Once the partial results are available, the asynchronous pricing service performs any necessary derived pricing operations and aggregates the partial results to generate a final pricing result. The asynchronous pricing service may also store the result and transmit/publish a response to the requestor indicating that the final pricing result is complete. The response, for example, may include a link or other information providing access to the final pricing result.

"Asynchronous" is used here to mean that the plurality of pricing jobs are executed separately and independently; each pricing engine will potentially start and/or complete executing its chunk at a different time than the other pricing engines. Thus, the time of processing of the different chunks (e.g., a first chunk and a second chunk) over an interval of time may fully overlap, partially overlap, or not overlap (e.g., be processed by respective pricing engines fully in parallel, partially in parallel, or not in parallel, respectively).

In some implementations, the asynchronous pricing service operates in parallel with the pricing service 120B previously described, including the scale-mode pricing runtime 700 and design time/low scale-mode pricing runtime 701. However, alternate or additional implementations may include the asynchronous pricing service as a sub-service within the pricing service 120A. For example, the pricing service as previously described can be configured with an asynchronous pricing API and the various asynchronous pricing components described herein for implementing asynchronous pricing operations.

Figure 13:
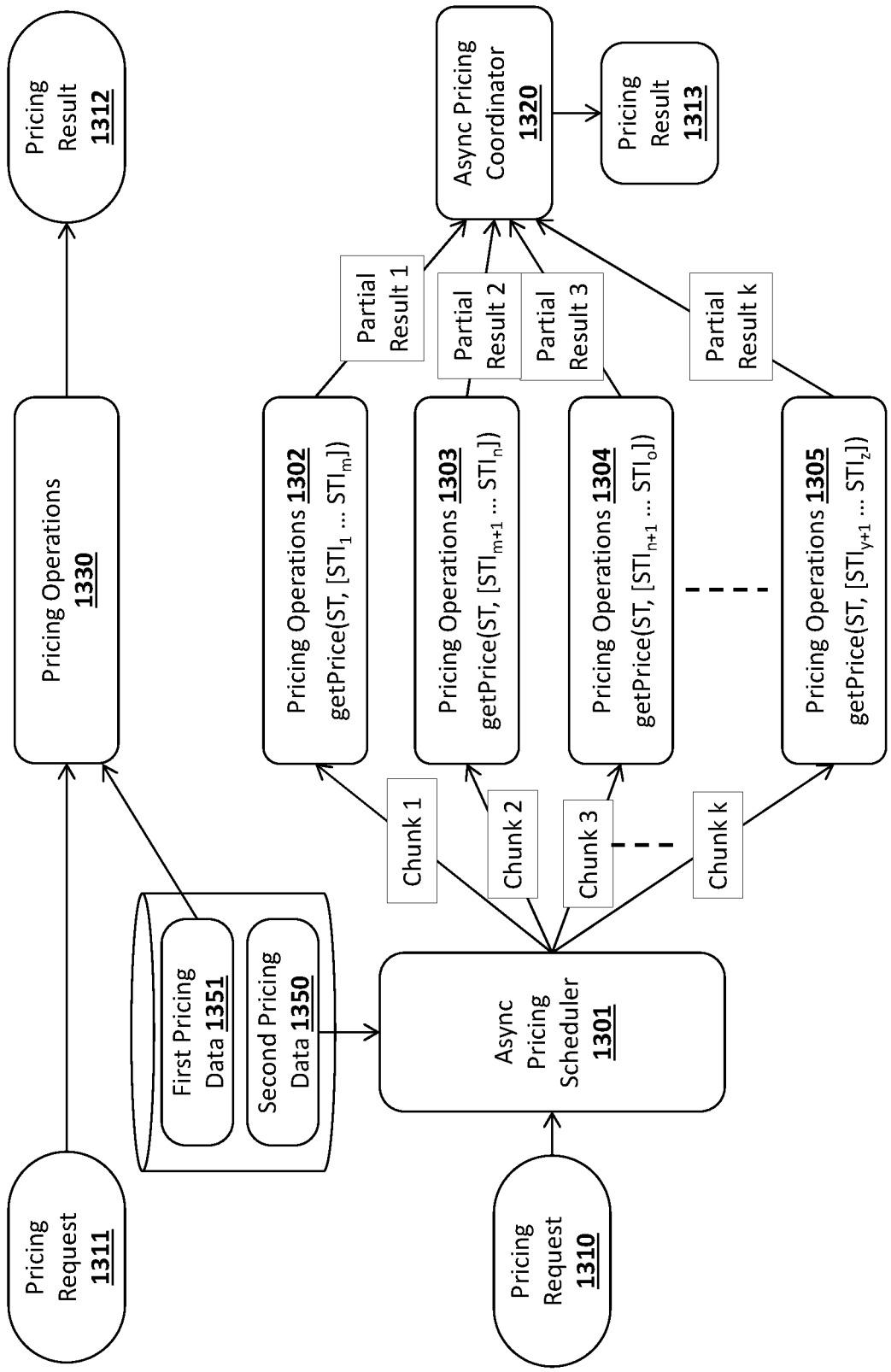
FIG. 13 illustrates an architecture for synchronous and asynchronous pricing request processing in accordance with some implementations.

FIG. 13 is a block diagram illustrating first set of pricing operations 1330 performed on a first set of pricing data 1351 in response to a first pricing request 1311 and a plurality of sets of pricing operations 1302-1305 performed on a second set of pricing data 1350 (subdivided into chunks 1-4) in response to a second pricing request 1310. The first set of pricing operations 1330 generates a first pricing result 1312 and the plurality of sets of pricing operations 1302-1305 generate partial results 1-4 which are combined to generate a second pricing result 1313. In some embodiments, an asynchronous pricing scheduler 1301 subdivides the second pricing data 1350 indicated by the second pricing request 1310 into a plurality of portions, sometimes referred to as chunks 1-4. Each portion or chunk is associated with a separate pricing job which performs one of the separate sets of pricing operations 1302-1305.

In some implementations, an asynchronous pricing coordinator 1320 processes the partial results 1-4 to generate the second pricing result 1313. For example, the asynchronous pricing coordinator 1320 may perform derived pricing operations (if any) and aggregate the partial results 1-4 to generate the second pricing result 1313.

In some implementations, a method is performed on a set of one or more electronic devices to perform pricing operations. In at least one implementation, illustrated in FIG. 14, first and second pricing requests are received at 1401. The first pricing request is associated with a first set of pricing data having a first size (e.g., an average-sized list of sales transaction items) and the second pricing request is associated with a second set of pricing data having a second size greater than the first size (e.g., a list of 1000 or more sales transaction items). A first set of pricing operations are performed at 1402 on the first set of pricing data in response to the first pricing request to generate a first pricing result. For example, the first pricing request can be serviced by the pricing engine 115A in the scale-mode pricing runtime 700 or the pricing engine 115B in the design time/low scale-mode pricing runtime 701.

At 1403, the second set of pricing data is subdivided into a plurality of portions. For example, a list of 10,000 sales transaction items can be subdivided into 20 portions, with each portion having 500 transaction items. At 1404, a plurality of pricing jobs are specified corresponding to the plurality of portions to generate a corresponding plurality of partial pricing results, where each pricing job indicates a separate set of pricing operations. At 1405, the plurality of partial pricing results are processed to generate a second pricing result. For example, in some implementations, derived pricing operations are performed (if needed) and the partial pricing results are aggregated to generate the second pricing result.

Figure 15A:
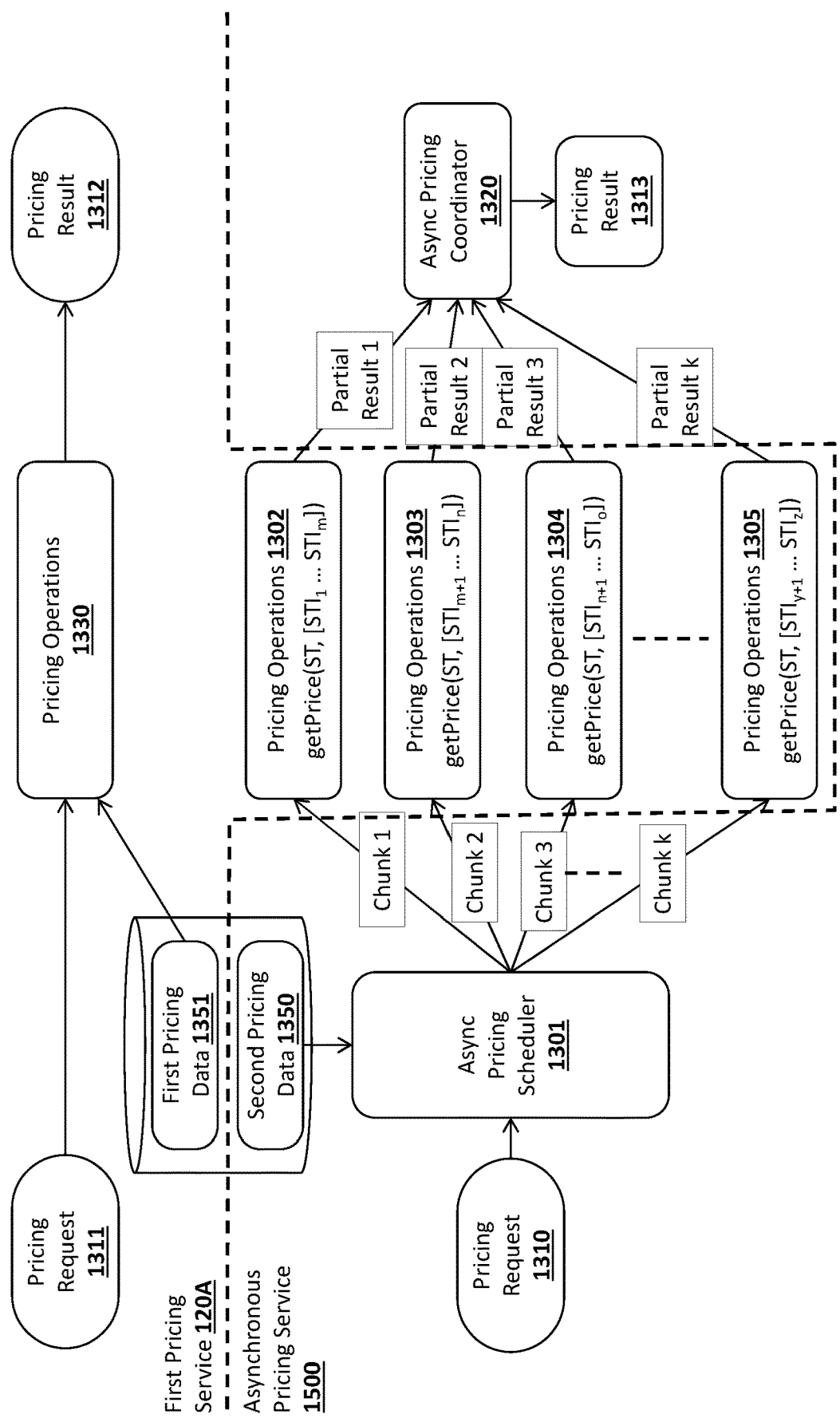
FIGS. 15A-B illustrate an architecture for processing synchronous and asynchronous pricing requests, including an asynchronous pricing scheduler and asynchronous pricing coordinator in accordance with some implementations.

FIG. 15A is a block diagram illustrating implementations in which the first set of pricing operations 1330 resulting from pricing request 1311 and the plurality of sets of pricing operations 1302-1305 resulting from pricing request 1310 are performed on a first pricing service 120A while the operations of subdividing the second pricing data 1350 into a plurality of portions and processing the partial results to generate the second pricing result 1313 are performed on a second pricing service 1500. In some implementations, the second pricing service 1500 is referred to as the "asynchronous" pricing service, which subdivides large pricing requests 1310 (e.g., associated with a large list of sales transaction items) into portions which are executed asynchronously (e.g., independently and at least partially overlapping) on the first pricing service 120A.

In alternate implementations, however, the pricing operations 1302-1305 are executed within the second pricing service 1500 to generate the partial pricing results.

As mentioned, in some implementations, the asynchronous pricing coordinator 1320 performs any required derived pricing operations and aggregates the partial results to generate the second pricing result 1313. In at least some implementations, both the pricing service 120A and the asynchronous pricing service 1500 are operable within the scale-mode pricing runtime 700 and/or the design time/low scale-mode pricing runtime 701.

Figure 15B:
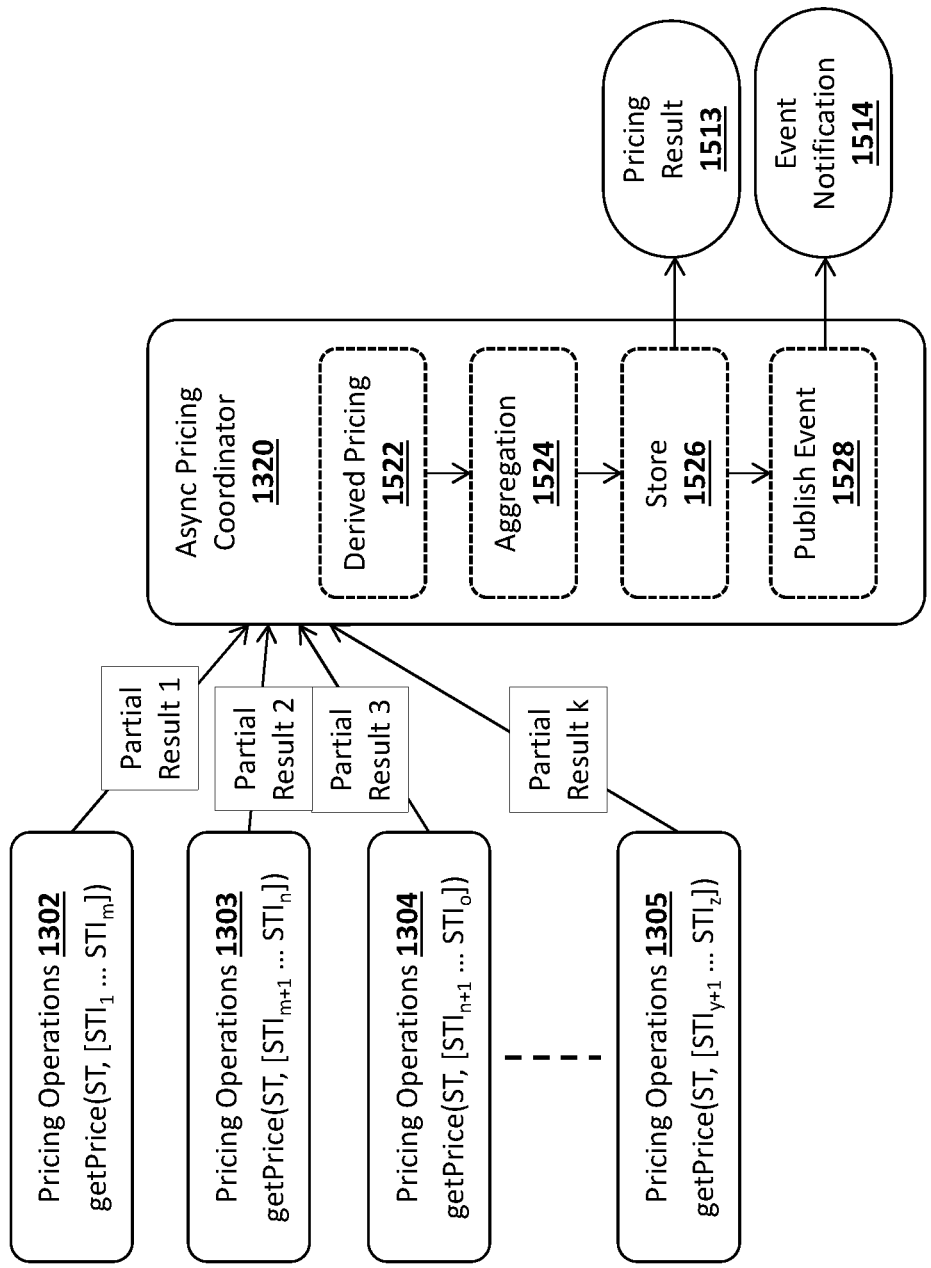

FIG. 15B illustrates additional details associated with some implementations. The asynchronous pricing coordinator 1320 operating within the asynchronous pricing service 1500 detects when all of the partial results (1-k) are available. In some implementations, it does so by periodically querying the database or other data service where completion records for the partial results are stored.

When the partial results are all available, the asynchronous pricing coordinator 1320 initiates a sequence of operations including a derived pricing operation 1522 which performs any remnant derived pricing calculations in which the price of a particular product is derived from the price of another product. For example, a particular pricing rule may indicate that the total price (TotalPrice) on line number 8,767 is 5% of the TotalPrice on line number 1,906. When synchronous pricing operations are performed, all of these line items are available in the same sequence of operations executed on the same pricing engine (i.e., so the derived pricing calculations can be performed within the same context). When performing multiple separate sequences of operations on multiple pricing engines 1302-1305 as shown in FIG. 15B, any derived pricing rules are applied by the derived pricing operation 1522 after all chunks are processed.

In some implementations, the derived pricing operation 1522 identifies any chunks that have these interdependent relationships and applies the derived pricing rules. The line items which require derived pricing operations may be identified within each set of pricing operations 1302-1305 during processing. For example, each set of pricing operations 1302-1305 may generate metadata (e.g., set flags) to indicate those line items which require derived pricing calculations after the partial results are generated. Additionally, or alternatively, any derived pricing operations contained entirely within a particular chunk may be performed by the set of operations 1302-1305 processing that chunk and provided in the partial result for that chunk.

In some implementations, when derived pricing operations 1522 are complete, an aggregation operation 1524 is performed to combine all of the partial results and generate a final result. For example, the aggregation operation 1524 may perform a summation across all line items to provide a final pricing result 1513 (e.g., Quote.TotalPrice=sum(TotalPrice of all line items)).

A store operation 1526 stores the final pricing result 1513 in a database or other data storage service and an event publication operation 1528 publishes an event notification 1514 which notifies the entity which requested the pricing operation. For example, some implementations include a publish/subscribe messaging platform to which each authorized system entity may publish messages indicating certain events and/or subscribe to receive these messages (e.g., asynchronous pricing messages). The asynchronous pricing coordinator 1320 publishes the event notification 1514 on the messaging platform, which the entity requesting the pricing operation will receive if it subscribed to receive asynchronous pricing messages related to its pricing request.

Figure 16A:
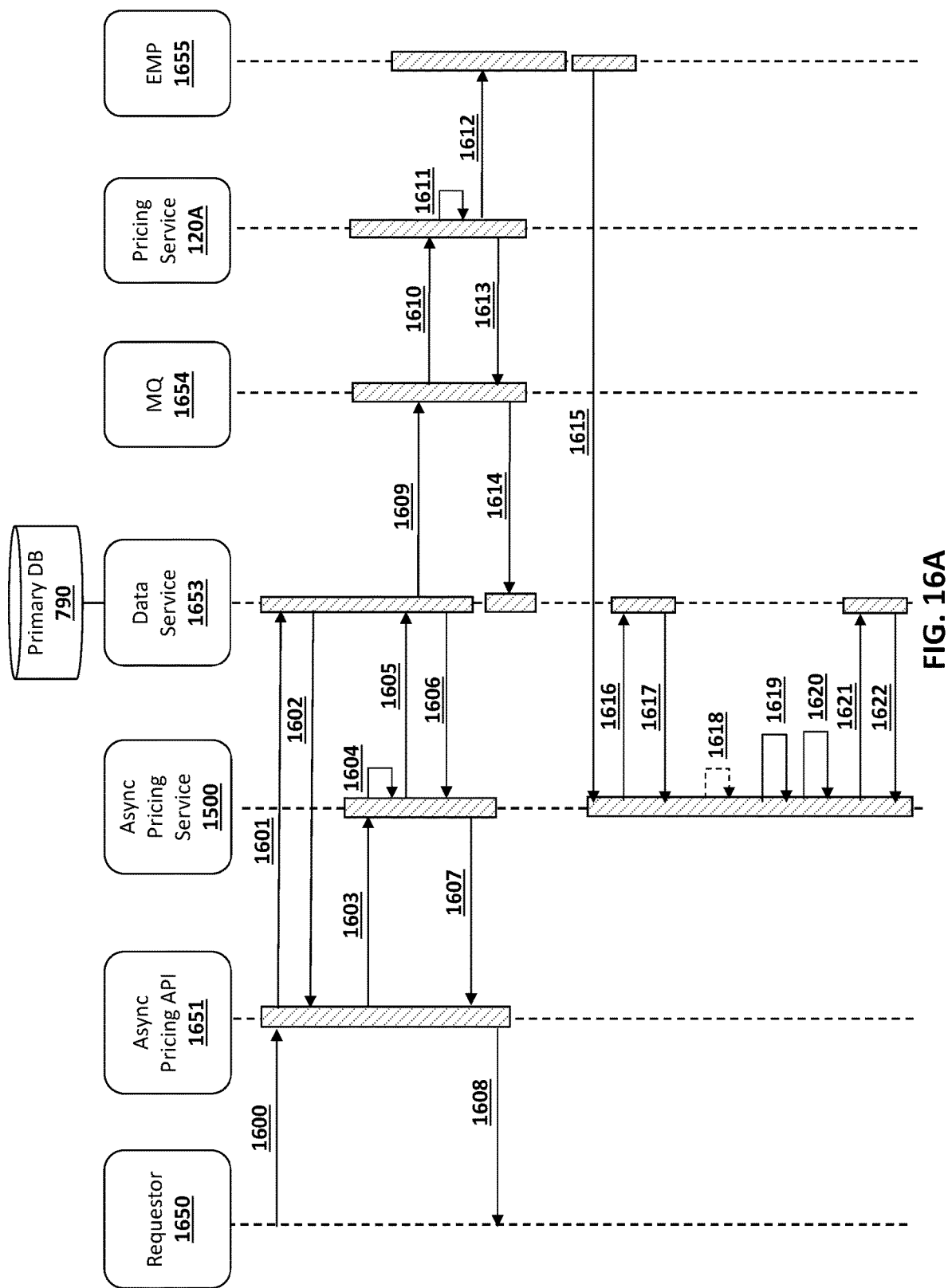
FIGS. 16A-C illustrate sequences of transactions for asynchronous pricing in accordance with some implementations.
Figure 16B:
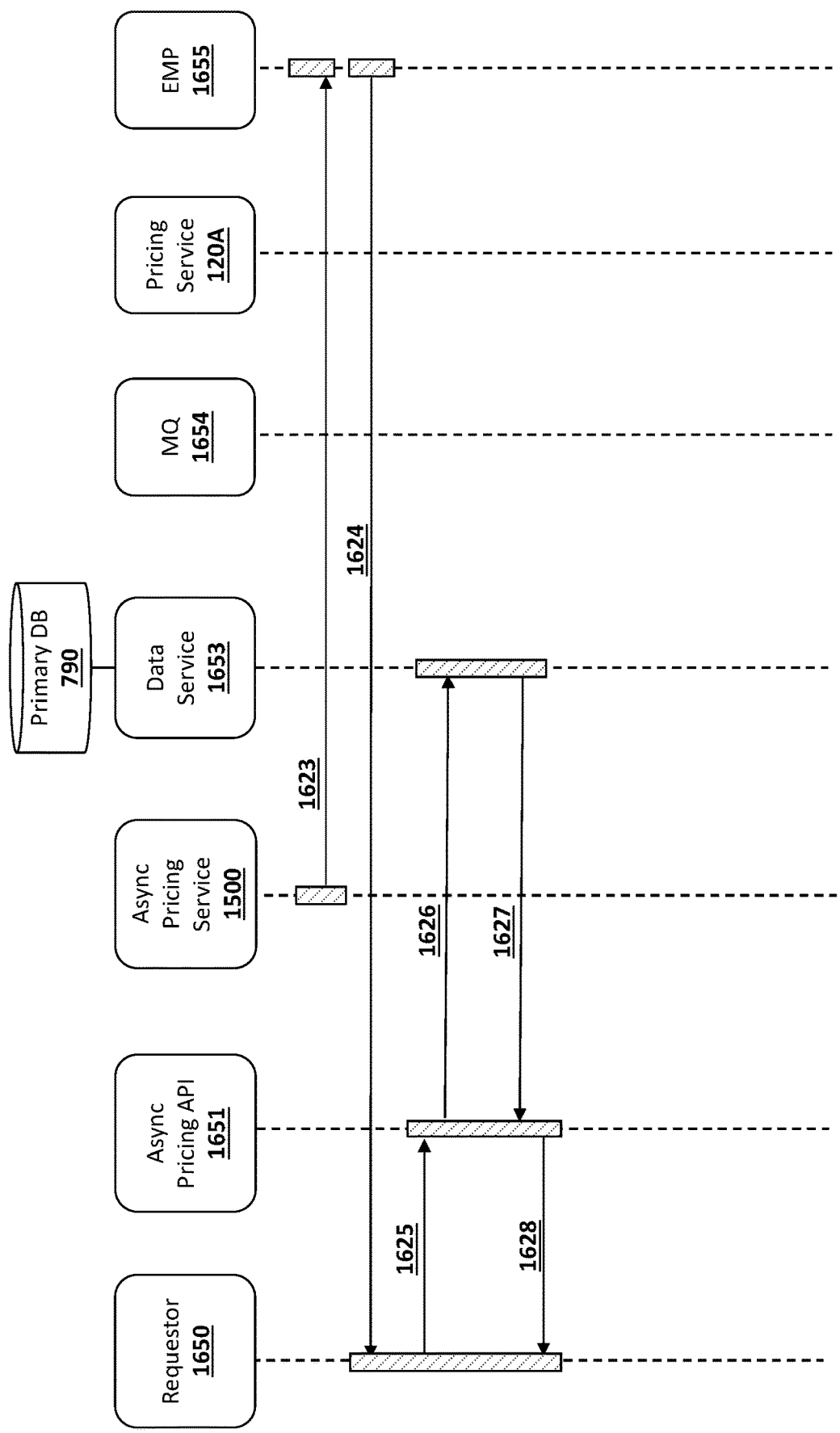
Figure 16C:
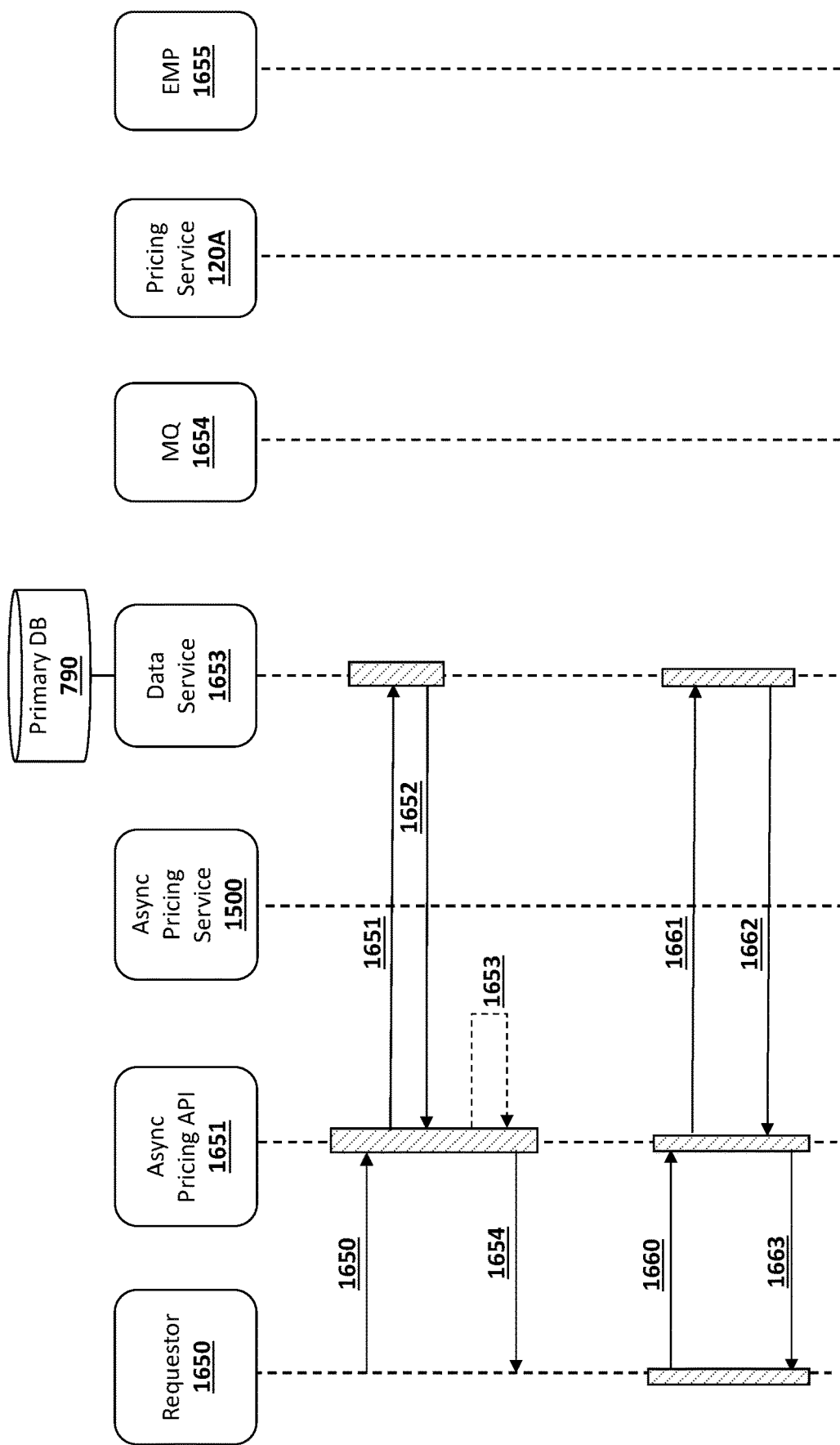

FIGS. 16A-C illustrate a sequence of transactions between various system components to perform asynchronous pricing operations in accordance with some implementations. The illustrated components include the requestor 1650 (the entity requesting the pricing operation), an asynchronous pricing application programming interface (API) 1651, the asynchronous pricing service 1500, a data service 1653, a message queue (MQ) 1654, the pricing service 120A and a messaging platform (MP) 1655.

In these implementations, the data service 1653 includes or is coupled to the primary database 790 and operates as a central message coordinator for inter-service messaging. By way of example, and not limitation, ZOS is used as the data service 1653 in some implementations. In the context of asynchronous pricing, the asynchronous pricing service 1500 queues messages for the pricing service 120A in the data service 1653, which commits the messages to the database 790. The messages in this implementation indicate the jobs to be performed by the pricing service 120A to process the pricing data chunks. For example, a separate message may be committed for each chunk. In some implementations, a message handler in the data service 1653 periodically wakes up (e.g., every few seconds) and checks the database for new messages that were committed since the last time it woke up. For the messages queued by the asynchronous pricing service 1500, it routes each such message to the pricing service 120A, which performs the specified pricing jobs (e.g., a separate child job corresponding to each chunk of pricing data).

In summary, in some implementations, the asynchronous pricing service 1500 publishes jobs by submitting a message for each job to the data service 1653, which commits each message to the database 790. A message handler, which subscribes to messages associated with asynchronous pricing (e.g., of type ASYNC_PRICING) wakes up periodically and locates the committed messages. For example, the event payload of each message may indicate that it is an asynchronous pricing job associated with a chunk of pricing data (e.g., "child job per chunk"). It then schedules these "child" jobs for execution asynchronously by the pricing service 120A (e.g., via handleMessage operations).

Referring now to the specific transactions in FIGS. 16A-C, at 1601, the requestor 1650 transmits an asynchronous pricing request which indicates (or which can be interpreted to identify) a plurality of sales transaction items (STI) (e.g., getPriceAsync(ST, $[STI_1 \ldots k]$). The asynchronous pricing API 1651 transmits a message 1601 to the data service 1653 to create an asynchronous job for the pricing service 120A and the data service 1653 responds with an acknowledgement indicating a job identifier (ID) 1602, which can be used to track the process of the asynchronous pricing job and to retrieve the final results. As mentioned, in some implementations, the pricing service 120B in the low-scale mode runtime 701 may be used instead of the pricing service 120A in the scale-mode pricing runtime 700.

The asynchronous pricing API 1651 provides the job ID in a message 1603 to the asynchronous pricing service 1500. The message 1603 also indicates the pricing data and operations to be performed on the pricing data. At 1604, the asynchronous pricing service 1500 subdivides the pricing data (e.g., sales items) and associated pricing operations into chunks (e.g., as previously described) and transmits a message 1605 to the data service 1653 indicating the child jobs to process each chunk. These jobs are referred to as "child" jobs because they each perform a subset of the work of the asynchronous pricing job (which is the "parent" job).

The data service 1653 enqueues the child jobs and transmits back a set of child job IDs to the asynchronous pricing service 1500 in message 1606. Message 1607 from the asynchronous pricing service 1500 provides a notification that the child jobs have started and message 1608 from the asynchronous pricing API 1651 provides the job ID for the asynchronous pricing operations to the requestor 1650.

In some implementations, the message handler wakes up and finds the messages associated with the child jobs enqueued at the data service 1653. It retrieves and queues these messages 1609 in one or more message queues 1654. While a single message 1609 is shown, several such messages may be queued (e.g., one for each child job) and messages 1609-1614 may be repeated for each child job.

The pricing service 120A reads the message 1610 (or the group of messages) from the message queue 1654, indicating the chunk of pricing operations and associated pricing data to be processed. The pricing service 120A processes each child job at 1611. When each child job completes, the pricing service 120A transmits a first message 1612 to an enterprise messaging platform (EMP) 1655 and a second message 1613 to the message queue 1654, both indicating completion of the child job. Message 1614 updates the child job status as "complete" in the data service 1653, ensuring that it will not be processed again by the message handler.

Message 1615 is transmitted from the enterprise messaging platform 1655 to notify the asynchronous pricing service 1500 that the associated child job is complete. The asynchronous pricing service 1500 queries the data service 1653 at 1616 to determine if all child jobs are complete and receives the status of all child jobs at 1617. If one or more child jobs are not complete, then the asynchronous pricing service 1500 waits at 1618 (e.g., performs one or more no-ops) before checking the data service 1653 again.

If the message 1617 indicates that all child jobs are complete, then at 1619, the asynchronous pricing service 1500 performs derived pricing calculations on the set of partial pricing results and, at 1620, performs aggregations to generate the asynchronous pricing result. It updates the asynchronous pricing job status to "complete" and stores results with message 1621. After receipt of an acknowledgement at 1622, the asynchronous pricing service 1500 transmits a notification indicating completion of the asynchronous pricing job at 1623 in FIG. 16B.

In some implementations, the requestor 1650 is subscribed with the enterprise messaging platform 1655 to receive asynchronous pricing notifications. Thus, the enterprise messaging platform 1655 transmits a push notification 1624 to the requestor 1650 indicating that the asynchronous messaging job is complete.

The requestor 1650 transmits message 1625 to retrieve the asynchronous pricing results, using the Job ID provided by message 1608. The asynchronous pricing API 1651 requests the data from the data service 1653 via message 1626, which it receives in message 1627 and passes on to the requestor 1650 in message 1628.

In some implementations, a transaction ID can be used to identify a particular set of pricing data within the data service 1653. Consequently, referring to FIG. 16C, the requestor 1650 can initiate the asynchronous pricing job by transmitting a message containing the transaction ID. In response, the pricing data is transmitted in a response message 1652 (e.g., as a sales transaction object graph), which the asynchronous pricing API 1651 uses to initiate the sequence of asynchronous pricing transactions at 1653, providing the job ID to the requestor 1650 with message 1654. Thus, in this implementation, transaction 1653 results in the sequence of transactions 1600-1628 described with respect to FIGS. 16A-B.

Prior to receiving the final asynchronous pricing results, the requestor 1650 may transmit a job status request 1660. The asynchronous pricing API 1651 checks the job status at the data service 1653 via a message 1661. The data service 1653 responsively returns the current status at 1662-1663.

Figure 17:
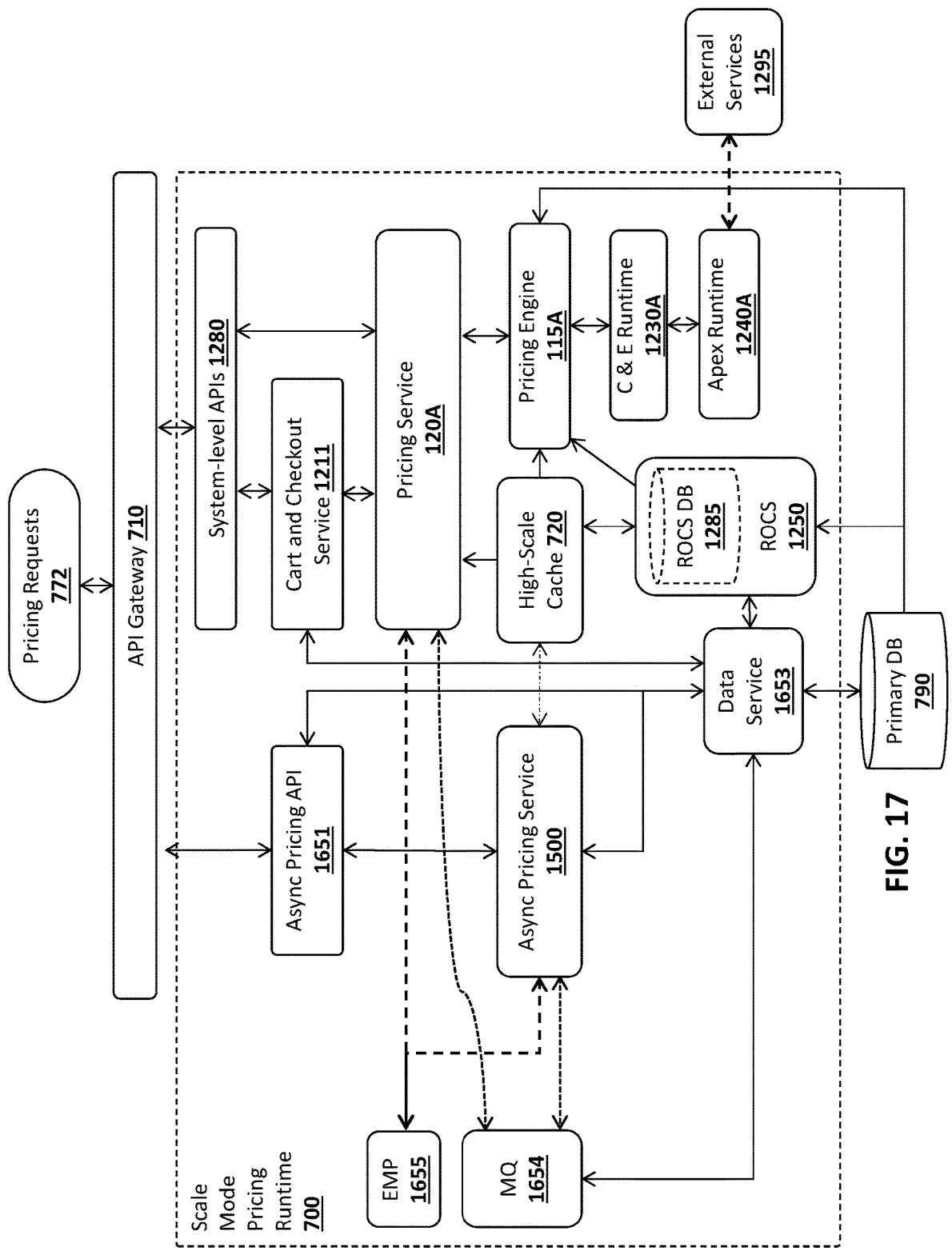
FIG. 17 illustrates additional details for an asynchronous pricing service in accordance with some implementations.

FIG. 17 illustrates additional details of certain implementations of the asynchronous pricing service 1500 shown within the context of a larger group of services including high-scale distributed data management services, e-commerce services, and external data services. While the illustrated implementation is shown within the scale-mode pricing runtime 700, other implementations may run the asynchronous pricing service 1500 and other illustrated components within the design-time/low-scale pricing runtime 701. An asynchronous pricing API 1651 receives asynchronous pricing requests and provides responses to entities. When performing asynchronous pricing operations, the asynchronous pricing service 1500 and pricing service 120A are provided with both read and write access to the database 790. Write access to the database 790 is provided for asynchronous pricing operations to allow partial results to be written to the database 790. In at least one implementation, the data service 1653 is the zero object service (ZOS) 1255, previously described with respect to FIG. 12. However, the underlying principles of these implementations are not limited to any specific type of data service or database.

Message queues 1654 are coupled to the data service 1653, pricing service 120A, and asynchronous pricing service 1500, to queue messages transmitted between the services. In some implementations, messages are submitted to the message queues 1654 by a message handler in the data service 1653 which periodically wakes up and checks the database for new messages that were committed since the last time it woke up. It queues any such messages in a message queue 1654 from which the messages are retrieved and processed by a service.

In some implementations, the enterprise messaging platform 1655 is a publish-subscribe platform which allows entities to publish and subscribe to receive notifications of certain types of messages. For example, both the entity making the asynchronous pricing request (e.g., requestor 1650) and the asynchronous pricing service 1500 can subscribe to receive notifications from the enterprise messaging platform 1655 when all or a portion of the asynchronous pricing job is complete. The pricing service 120A can publish these completion messages to the enterprise messaging platform 1655 as is completes the child jobs associated with chunks.

Each of the above-described services (e.g., read only data service 170, pricing service 120A, cart and checkout service 1211, external services 1295, CaaS 1296, asynchronous pricing service 1500, data service 1653) may be one of the service(s) 1842 in FIG. 18B (described in more detail below). In some configurations, each service may be implemented as a set of software instances, such as software instance 1802 in FIG. 18A, which operate together to provide the functionality of the respective service. In some implementations, the software instances associated with a particular service are included in a software container associated with the service (e.g., software containers 1804A-1804R in FIG. 18A). In at least some implementations, however, a service may be implemented with software instances from multiple software containers.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 18B:
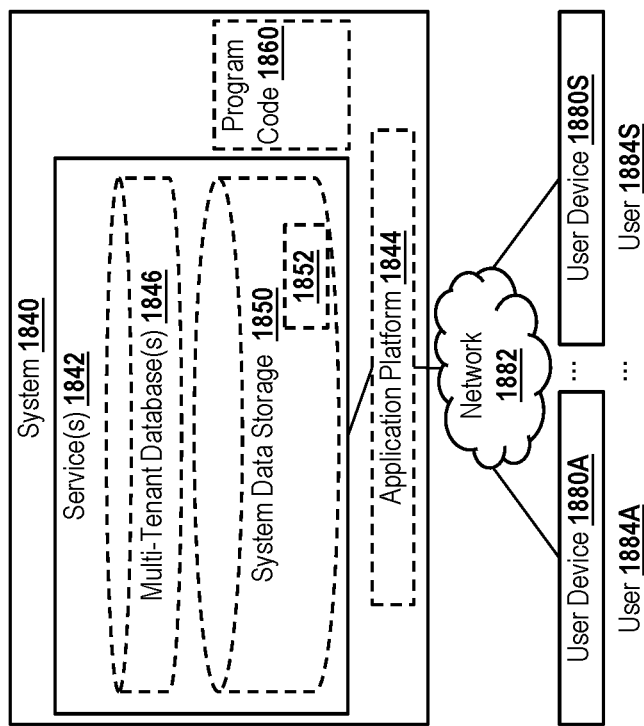
FIG. 18B is a block diagram of a deployment environment according to some example implementations.
Figure 18A:
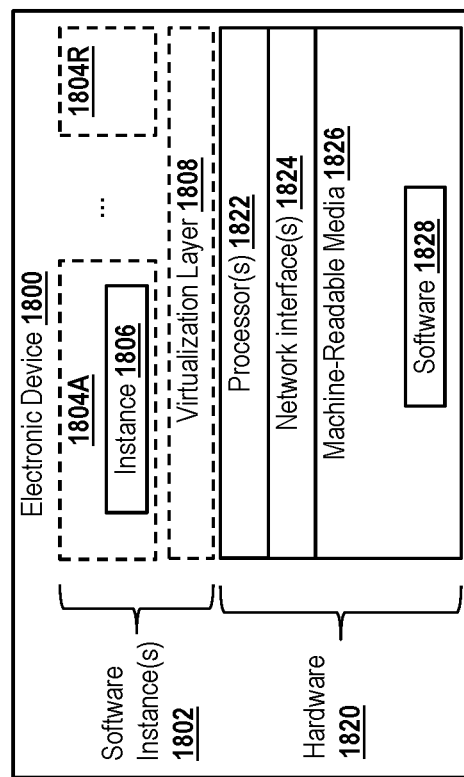
FIG. 18A is a block diagram illustrating an electronic device 1800 according to some example implementations.

FIG. 18A is a block diagram illustrating an electronic device 1800 according to some example implementations. FIG. 18A includes hardware 1820 comprising a set of one or more processor(s) 1822, a set of one or more network interfaces 1824 (wireless and/or wired), and machine-readable media 1826 having stored therein software 1828 (which includes instructions executable by the set of one or more processor(s) 1822). The machine-readable media 1826 may include non-transitory and/or transitory machine-readable media. Each of the previously described clients (including endpoints, such as REST endpoint 910), the pricing service 120A-B, and the asynchronous pricing service 1500, including the design time/low-scale mode pricing runtime 701 and the scale-mode pricing runtime 700, may be implemented in one or more electronic devices 1800. In one implementation: 1) each of the clients is implemented in a separate one of the electronic devices 1800 (e.g., in end user devices where the software 1828 represents the software to implement clients to interface directly and/or indirectly with the pricing service (e.g., software 1828 represents a web browser, a native client, a portal, a command-line interface, and/or an application programming interface (API) based upon protocols such as Simple Object Access Protocol (SOAP), Representational State Transfer (REST), etc.)); 2) the pricing service 701 and asynchronous pricing service 1500 are implemented in a separate set of one or more of the electronic devices 1800 (e.g., a set of one or more server devices where the software 1828 represents the software to implement the pricing service); and 3) in operation, the electronic devices implementing the clients (e.g., such as REST endpoints 910) and the pricing service 120A and asynchronous pricing service 1500 would be communicatively coupled (e.g., by a network) and would establish between them (or through one or more other layers and/or or other services) connections for submitting pricing requests to the pricing service 120A and asynchronous pricing requests to the asynchronous pricing service 1500 (e.g., serialized object graph requests) and returning pricing responses to the clients (e.g., serialized object graph responses). Other configurations of electronic devices may be used in other implementations (e.g., an implementation in which the client and the pricing service 120A and/or the client and the asynchronous pricing service 1500 are implemented on a single one of electronic device 1800).

During operation, an instance of the software 1828 (illustrated as instance 1806 and referred to as a software instance; and in the more specific case of an application, as an application instance) is executed. In electronic devices that use compute virtualization, the set of one or more processor(s) 1822 typically execute software to instantiate a virtualization layer 1808 and one or more software container(s) 1804A-1804R (e.g., with operating system-level virtualization, the virtualization layer 1808 may represent a container engine (such as Docker Engine by Docker, Inc. or rkt in Container Linux by Red Hat, Inc.) running on top of (or integrated into) an operating system, and it allows for the creation of multiple software containers 1804A-1804R (representing separate user space instances and also called virtualization engines, virtual private servers, or jails) that may each be used to execute a set of one or more applications; with full virtualization, the virtualization layer 1808 represents a hypervisor (sometimes referred to as a virtual machine monitor (VMM)) or a hypervisor executing on top of a host operating system, and the software containers 1804A-1804R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1828 is executed within the software container 1804A on the virtualization layer 1808. In electronic devices where compute virtualization is not used, the instance 1806 on top of a host operating system is executed on the "bare metal" electronic device 1800. The instantiation of the instance 1806, as well as the virtualization layer 1808 and software containers 1804A-1804R if implemented, are collectively referred to as software instance(s) 1802.

Alternative implementations of an electronic device may have numerous variations from that described above. For example, customized hardware and/or accelerators might also be used in an electronic device.

Example Environment

FIG. 18B is a block diagram of a deployment environment according to some example implementations. A system 1840 includes hardware (e.g., a set of one or more server devices) and software to provide service(s) 1842, including the pricing service. In some implementations the system 1840 is in one or more datacenter(s). These datacenter(s) may be: 1) first party datacenter(s), which are datacenter(s) owned and/or operated by the same entity that provides and/or operates some or all of the software that provides the service(s) 1842; and/or 2) third-party datacenter(s), which are datacenter(s) owned and/or operated by one or more different entities than the entity that provides the service(s) 1842 (e.g., the different entities may host some or all of the software provided and/or operated by the entity that provides the service(s) 1842). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1840 is coupled to user devices 1880A-1880S over a network 1882. The service(s) 1842 may be on-demand services that are made available to one or more of the users 1884A-1884S working for one or more entities other than the entity which owns and/or operates the on-demand services (those users sometimes referred to as outside users) so that those entities need not be concerned with building and/or maintaining a system, but instead may make use of the service(s) 1842 when needed (e.g., when needed by the users 1884A-1884S). The service(s) 1842 may communicate with each other and/or with one or more of the user devices 1880A-1880S via one or more APIs (e.g., a REST API). In some implementations, the user devices 1880A-1880S are operated by users 1884A-1884S, and each may be operated as a client device and/or a server device. In some implementations, one or more of the user devices 1880A-1880S are separate ones of the electronic device 1800 or include one or more features of the electronic device 1800.

In some implementations, the system 1840 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 1840 is a multi-tenant cloud computing architecture supporting multiple services, such as one or more of the following types of services:

Pricing; Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Cache-as-a-Service (CaaS); Analytics; Community; Internet-of-Things (IoT); Industry-specific; Artificial intelligence (AI); Application marketplace ("app store"); Data modeling; Security; and Identity and access management (IAM).

For example, system 1840 may include an application platform 1844 that enables PAAS for creating, managing, and executing one or more applications developed by the provider of the application platform 1844, users accessing the system 1840 via one or more of user devices 1880A-1880S, or third-party application developers accessing the system 1840 via one or more of user devices 1880A-1880S.

In some implementations, one or more of the service(s) 1842 may use one or more multi-tenant databases 1846, as well as system data storage 1850 for system data 1852 accessible to system 1840. In certain implementations, the system 1840 includes a set of one or more servers that are running on server electronic devices and that are configured to handle requests for any authorized user associated with any tenant (there is no server affinity for a user and/or tenant to a specific server). The user devices 1880A-1880S communicate with the server(s) of system 1840 to request and update tenant-level data and system-level data hosted by system 1840, and in response the system 1840 (e.g., one or more servers in system 1840) automatically may generate one or more Structured Query Language (SQL) statements (e.g., one or more SQL queries) that are designed to access the desired information from the multi-tenant database(s) 1846 and/or system data storage 1850.

In some implementations, the service(s) 1842 are implemented using virtual applications dynamically created at run time responsive to queries from the user devices 1880A-1880S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1860 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. In some implementations, the program code 1860 may form at least a portion of the scale-mode pricing runtime 700, which provides the execution environment for the pricing service 120A, asynchronous pricing service 1500, instances of the pricing engines 115A, and various other system components described above. Further, in one implementation, the application platform 1844 includes an application setup mechanism that supports application developers' creation and management of applications, which may be saved as metadata by save routines. Invocations to such applications, including the pricing service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1882 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1840 and the user devices 1880A-1880S.

Each user device 1880A-1880S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1840. For example, the user interface device can be used to access data and applications hosted by system 1840, and to perform searches on stored data, and otherwise allow one or more of users 1884A-1884S to interact with various GUI pages that may be presented to the one or more of users 1884A-1884S. User devices 1880A-1880S might communicate with system 1840 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1880A-1880S might include an HTTP client, commonly referred to as a "browser," for sending and receiving HTTP messages to and from server(s) of system 1840, thus allowing users 1884A-1884S of the user devices 1880A-1880S to access, process and view information, pages and applications available to it from system 1840 over network 1882.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. For example, while the asynchronous pricing service 1500 described above queues child jobs for the pricing service 120A operating within the scale-mode runtime 700, the child jobs may also be queued for execution by the pricing service 120B within the low-scale mode runtime 701. In addition, while a single pricing API 180A and a single pricing engine 115A are illustrated within the scale-mode pricing runtime 700, multiple instances of the pricing API and a corresponding plurality of pricing engines may be operative within the scale-mode pricing runtime 700. For example, multiple instances of the pricing engine 115A may be operated on different servers within a datacenter and across multiple datacenter locations. Thus, the API gateway 710 may forward different requests to different pricing APIs within the scale-mode pricing runtime 700, to be serviced by different corresponding pricing engines 115A depending on the location of the requestors.

Alternatively, or additionally, there is only one pricing engine 115A operative within the scale-mode pricing runtime 700, but the pricing engine 115A and the associated scale-mode pricing runtime 700 are scaled to support increases in pricing request traffic through the allocation of additional data processing and network resources. For example, additional data processing and network resources can be allocated to allow the pricing engine 115A to concurrently execute a larger number of getPrice functions and/or other pricing operations.

What is claimed is:

1. An article of manufacture comprising:
 a non-transitory machine-readable storage medium that provides instructions that, if executed by a set of one or more electronic devices, are configurable to cause the set of electronic devices to perform operations comprising:
  receiving a first pricing request in accordance with a first application programming interface (API) of a first pricing service, the first pricing request indicating a first set of pricing data of a first size,
  responsively performing by the first pricing service a first set of pricing operations on the first set of pricing data to generate a first pricing result;
  receiving a second pricing request in accordance with a second API of the first pricing service or a second pricing service, the second API supporting asynchronous pricing operations, the second pricing request indicating a second set of pricing data of a second size greater than the first size;
  subdividing the second set of pricing data indicated by the second pricing request into a plurality of portions;
  scheduling, by a scheduler, a plurality of pricing jobs corresponding to the plurality of portions, each pricing job indicating a separate set of pricing operations;
  queuing, by the scheduler, the plurality of pricing jobs for execution;
  executing the plurality of pricing jobs partly or entirely in parallel by pricing engines of the first pricing service and/or the second pricing service to produce a corresponding plurality of partial results; and
  aggregating the plurality of partial pricing results to generate a second pricing result.

2. The article of manufacture of claim 1 wherein the scheduler comprises a scheduler of the second pricing service, and wherein the second pricing service is to perform the operations of subdividing the second set of pricing data indicated by the second pricing request into a plurality of portions.

3. The article of manufacture of claim 2 wherein the first pricing service is to perform the operations of performing a first set of pricing operations on the first set of pricing data to generate a first pricing result and executing the plurality of pricing jobs partly or entirely in parallel with the pricing engines to produce a corresponding plurality of partial results.

4. The article of manufacture of claim 1 wherein aggregating the plurality of partial pricing results comprises:
 performing one or more derived pricing operations on the partial pricing results to generate updated partial pricing results; and
 aggregating the updated partial pricing results to generate the second pricing result.

5. The article of manufacture of claim 4 wherein second pricing service is further configured to:
 store the second pricing result in a data service; and
 publish a notification in a messaging platform to notify a requestor associated with the second pricing request that the second pricing result is available.

6. The article of manufacture of claim 5 wherein queuing the plurality of pricing jobs for execution comprises storing each of the plurality of pricing jobs in the data service.

7. The article of manufacture of claim 6 wherein a handler is to detect each of the plurality of pricing jobs in the data service and submit a corresponding plurality of messages in a message queue to notify the second service.

8. The article of manufacture of claim 1 wherein the first set of pricing data comprises a first plurality of sales transaction items and the second set of pricing data comprises a second plurality of sales transaction items, and wherein subdividing the second set of pricing data comprises including each sales transaction item in the second plurality of sales transaction items in one of the plurality of portions.

9. A method implemented in a set of one or more electronic devices, the method comprising:
receiving a first pricing request in accordance with a first application programming interface (API) of a pricing service, the first pricing request indicating a first set of pricing data of a first size,
responsively performing by the pricing service a first set of pricing operations on the first set of pricing data to generate a first pricing result;
receiving a second pricing request in accordance with a second API of the pricing service or a different pricing service, the second API supporting asynchronous pricing operations, the second pricing request indicating a second set of pricing data of a second size greater than the first size;
subdividing the second set of pricing data indicated by the second pricing request into a plurality of portions;
scheduling, by a scheduler, a plurality of pricing jobs corresponding to the plurality of portions, each pricing job indicating a separate set of pricing operations;
queuing, by the scheduler, the plurality of pricing jobs for execution;
executing the plurality of pricing jobs partly or entirely in parallel by pricing engines of the pricing service or the different pricing service to produce a corresponding plurality of partial results; and
aggregating the plurality of partial pricing results to generate a second pricing result.

10. The method of claim 9 wherein the scheduler comprises a scheduler of the second pricing service, and wherein the second pricing service is to perform the operations of subdividing the second set of pricing data indicated by the second pricing request into a plurality of portions.

11. The method of claim 10 wherein the first pricing service is to perform the operations of performing a first set of pricing operations on the first set of pricing data to generate a first pricing result and executing the plurality of pricing jobs partly or entirely in parallel with the pricing engines to produce a corresponding plurality of partial results.

12. The method of claim 9 wherein aggregating the plurality of partial pricing results comprise:
performing one or more derived pricing operations on the partial pricing results to generate updated partial pricing results; and
aggregating the updated partial pricing results to generate the second pricing result.

13. The method of claim 11 wherein second pricing service is further configured to:
store the second pricing result in a data service; and
publish a notification in a messaging platform to notify a requestor associated with the second pricing request that the second pricing result is available.

14. The method of claim 13 wherein queuing the plurality of pricing jobs for execution comprises storing each of the plurality of pricing jobs in the data service.

15. The method of claim 14 wherein the set of one or more electronic devices are to execute instructions to implement a handler to detect each of the plurality of pricing jobs in the data service and submit a corresponding plurality of messages in a message queue to notify the second service.

16. The method of claim 9 wherein the first set of pricing data comprises a first plurality of sales transaction items and the second set of pricing data comprises a second plurality of sales transaction items, and wherein subdividing the second set of pricing data comprises including each sales transaction item in the second plurality of sales transaction items in one of the plurality of portions.

* * * * *